United States Patent
Maeda

(10) Patent No.: US 9,857,270 B2
(45) Date of Patent: Jan. 2, 2018

(54) SHAPE MEASURING METHOD, SHAPE MEASURING APPARATUS, PROGRAM, RECORDING MEDIUM, METHOD OF MANUFACTURING OPTICAL ELEMENT, AND OPTICAL ELEMENT

(71) Applicant: CANON KABUSHIKI KAISHA, Tokyo (JP)

(72) Inventor: Atsushi Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 15/018,933

(22) Filed: Feb. 9, 2016

(65) Prior Publication Data
US 2016/0238482 A1 Aug. 18, 2016

(30) Foreign Application Priority Data
Feb. 16, 2015 (JP) .................................. 2015-027757

(51) Int. Cl.
*G06K 9/00* (2006.01)
*G01M 11/08* (2006.01)
(Continued)

(52) U.S. Cl.
CPC ............. *G01M 11/08* (2013.01); *G01B 11/24* (2013.01); *G01J 9/00* (2013.01)

(58) Field of Classification Search
CPC ............ G01M 11/08; G01J 9/00; G01B 11/24
See application file for complete search history.

(56) References Cited

U.S. PATENT DOCUMENTS 5,960,379 A * 9/1999 Shimizu ............... G01B 11/255
356/511
7,165,335 B2 1/2007 McMurtry
(Continued)

FOREIGN PATENT DOCUMENTS

| JP | 2003-057016 A | 2/2003 |
| JP | 2013-160680 A | 8/2013 |
| JP | 2013-186017 A | 9/2013 |

OTHER PUBLICATIONS

Extended European Search Report dated Jun. 23, 2016, issued in corresponding European Patent Application No. 16155434.0-1568.

*Primary Examiner* — John Strege
(74) *Attorney, Agent, or Firm* — Fitzpatrick, Cella, Harper & Scinto

(57) ABSTRACT

A rotary stage is controlled to two measurement positions along a rotational direction in which an object surface is moved when detecting a wavefront of reflected light from partial regions by a detector, to move the object surface. Respective placement errors in a trajectory of the object surface at the two measurement positions are measured based on wavefronts detected by the detector in states in which the rotary stage is controlled to each of the two measurement positions. For the remaining measurement positions among the measurement positions, respective placement errors with respect to the trajectory of the object surface are estimated based on the placement errors measured. Before measurement of each item of partial shape data, the rotary stage is controlled to a measurement position and stages are controlled to a position that cancels a placement error at the measurement position to align the object surface.

18 Claims, 15 Drawing Sheets

(51) Int. Cl.
*G01B 11/24* (2006.01)
*G01J 9/00* (2006.01)

(56) References Cited

U.S. PATENT DOCUMENTS

| | | | | |
|---|---|---|---|---|
| 8,593,615 | B2* | 11/2013 | Sasaki | G01B 11/2441 |
| | | | | 355/55 |
| 9,239,964 | B2 | 1/2016 | Yonetani et al. | |
| 2006/0037208 | A1 | 2/2006 | McMurtry | |
| 2009/0306931 | A1* | 12/2009 | Negishi | G01B 21/045 |
| | | | | 702/167 |
| 2010/0141958 | A1* | 6/2010 | Hasegawa | G01B 11/24 |
| | | | | 356/511 |
| 2010/0302523 | A1* | 12/2010 | Shiraishi | G03F 7/706 |
| | | | | 355/67 |
| 2011/0032503 | A1* | 2/2011 | Sasaki | G01B 11/2441 |
| | | | | 355/72 |
| 2011/0112785 | A1* | 5/2011 | Nakauchi | G01B 11/2441 |
| | | | | 702/85 |
| 2011/0119011 | A1* | 5/2011 | Yamazoe | G01B 11/2441 |
| | | | | 702/85 |
| 2011/0141484 | A1* | 6/2011 | Arnold | G01B 9/021 |
| | | | | 356/512 |
| 2012/0013916 | A1* | 1/2012 | Osaki | G01M 11/0271 |
| | | | | 356/496 |
| 2013/0202215 | A1 | 8/2013 | Yonetani et al. | |
| 2013/0235472 | A1 | 9/2013 | Furukawa et al. | |

* cited by examiner

SHAPE MEASURING METHOD, SHAPE MEASURING APPARATUS, PROGRAM, RECORDING MEDIUM, METHOD OF MANUFACTURING OPTICAL ELEMENT, AND OPTICAL ELEMENT

BACKGROUND OF THE INVENTION

Field of the Invention

The present invention relates to shape measurement of an object surface of an object.

Description of the Related Art

In recent years, aspheric optical elements that are axially symmetric and have a wide angle are widely used in optical instruments such as cameras and optical drives. Accompanying increases in the accuracy of these optical instruments, there is also a demand to improve the accuracy with respect to the shapes of such optical elements. In order to realize highly accurate shapes of such optical elements, it is necessary to measure the shapes of the optical elements with high accuracy.

As a technique for measuring the shape of an aspheric optical element that is axially symmetric, a configuration has been proposed that measures the shape of an object lens based on a difference between the shape of a reference surface of a reference lens and an object surface of an object lens using a Shack-Hartmann sensor that is a wavefront sensor (see Japanese Patent Application Laid-Open No. 2013-186017).

In shape measurement using such kind of wavefront sensor, first, light of spherical waves is irradiated onto a reference surface of a reference lens, that is formed on the reference lens. The reference surface of the reference lens is created based on the design shape of the object surface of the object lens, and the shape thereof is known. The reference lens is mounted so that an aspheric axis of the reference surface matches an optical axis of a spherical wave. Reflected light from the reference surface is imaged with an imaging lens, and a Shack-Hartmann sensor is arranged on an imaging face thereof. As is known, a Shack-Hartmann sensor is a wavefront sensor that includes an imaging device and a microlens array. A wavefront of the reflected light that is imaged is measured by the Shack-Hartmann sensor. At such time, a position in an optical axis direction of the apex of the reference surface is measured with a length measuring machine.

Next, the object lens is mounted instead of the reference lens. After mounting the object lens, in order to suppress a coma aberration component and a tilt component of a wavefront of reflected light that is incident on the Shack-Hartmann sensor, a position and an inclination of the object lens in a direction perpendicular to the optical axis is adjusted. The reason for doing so is that, when the aspheric axis that is axially symmetric deviates from the optical axis of the spherical wave, a coma aberration component and a tilt component arise in a case where the object lens is moved in a direction perpendicular to the optical axis, and a tilt component arises in a case where the optical, axis is inclined. By this means, the axis of the object surface on the object lens matches the optical axis of the spherical wave. In addition, while monitoring a position of the apex of the object surface using the length measuring machine, the position of the object surface in the optical axis direction is adjusted so as to match the reference surface. As a result, the object surface is mounted at the same position and with the same inclination as the reference surface. Thereafter, a reflected light wavefront that is imaged with the imaging lens is measured with the Shack-Hartmann sensor. A difference between the shape of the reference surface and the shape of the object surface is calculated based on the two wavefronts, and the shape of the object surface is obtained by adding the thus-calculated difference between the shapes to the shape of the reference surface that is known.

In the above-described configuration, there is a finite aberration in the measuring optical system, for example, in the imaging lens, and an error that is caused by this aberration that is other than the information relating to the object surface shape is included in the reflected light wavefront of the object surface that is imaged by the Shack-Hartmann sensor. Further, since the same imaging lens is also used for measurement of the reference surface, and the reference surface is mounted at the same position as the object surface, the same error that is caused by the aberration of the imaging lens is also included in the reflected light wavefront of the reference surface. In Japanese Patent Application Laid-Open No. 2013-186017, the influence of this aberration is eliminated by acquiring a difference between the reflected light wavefront of the object surface and the reflected light wavefront of the reference surface.

Further, stitching measurement using an interferometer has been proposed as a technique for measuring the shape of a spherical optical element with a wide angle (see Japanese Patent Application Laid-Open No. 2003-57016). According to this technique, a wide-angle lens is divided into a plurality of partial regions, and each partial shape is measured with an interferometer. When switching the partial region to be measured, the object surface is inclined by fixing the center of curvature of the object surface, and is rotated around the axis of the object surface. By stitching a plurality of items of partial shape data acquired in this way, the shape of the object surface is acquired across the whole of the object surface. When this technique is employed, even if a lens has an angle that is wider than the converging angle of the optical system, the shape of the lens can be measured.

As a technique for measuring the shape of an aspheric optical element with a wide angle, it is conceivable to introduce the stitching measurement technique described in Japanese Patent Application Laid-Open No. 2003-57016 into the shape measurement technique using a Shack-Hartmann sensor that is described in Japanese Patent Application Laid-Open No. 2013-186017.

However, in order to introduce the stitching measurement technique described in Japanese Patent Application Laid-Open No. 2003-57016 into the shape measurement technique using a Shack-Hartmann sensor described in Japanese Patent Application Laid-Open No. 2013-186017 and to also maintain the measurement accuracy, it is necessary to align the position of the object surface each time before performing measurement in the respective partial regions. Unless alignment is performed, an optical path that the reflected light passes through will differ between the reference surface and the object surface, and since the aberration of the measurement optical system will change, it will not be possible to accurately correct a shape measurement error caused by an optical system aberration. That is, the shape measuring accuracy will decrease.

In this connection, if the position of the object surface is measured and alignment is performed each time before performing measurement of the shape of respective partial regions, a large amount of time will be required for alignment. Measuring the position of the object surface, in particular, requires a large amount of time during alignment. For example, if the position of the object surface is measured by wavefront measurement and a length measuring machine in accordance with the method described in Japanese Patent Application Laid-Open No. 2013-186017, several tens of seconds will be required for a single measurement. The time required to perform measurement for all of the positions will be a time obtained by multiplying the time required for a single measurement by the number of partial regions.

An object of the present invention is, when measuring partial shapes of respective partial regions of an object surface, to reduce the time required for alignment while maintaining the alignment accuracy of the object surface.

SUMMARY OF THE INVENTION

According to an aspect of the present invention, a shape measuring method for measuring a shape of an object surface of an object is performed by: controlling, by means of a controlling unit, a first stage that scans the object having the object surface in a drive direction and a second stage that moves the object in a direction that is different from the drive direction of the first stage, to thereby move the object surface along a trajectory that is previously set; irradiating a measuring beam sequentially onto a plurality of partial regions of the object surface; detecting wavefronts of reflected light from each of the plurality of partial regions by a detecting unit; and using the controlling unit to calculate partial shape data of the plurality of partial regions based on the wavefronts, and stitch the partial shape data; the shape measuring method comprising: moving in which the controlling unit controls the first stage to move the object surface to at least two positions along the drive direction that are less than a number of a plurality of measurement positions along the drive directions to which the object surface is moved when detecting a wavefront of reflected light of each of the plurality of partial regions by means of the detecting unit; actual measuring in which the controlling unit actually measures respective placement errors with respect to the trajectory of the object surface at the at least two positions based on wavefronts detected by the detecting unit in states in which the first stage is controlled to each of the at least two positions; estimating in which the controlling unit estimates respective placement errors with respect to the trajectory of the object surface with regard to positions of the first stage other than the at least two positions among the plurality of measurement positions based on the placement errors that are actually measured by the actual measuring; and aligning in which, before each detection at a time of detecting respective wavefronts of reflected light from the plurality of partial regions by means of the detecting unit for calculating the partial shape data, the controlling unit controls the first stage to the measurement position and controls the second stage to a position that cancels out a placement error at the measurement position, to thereby align the object surface.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment (Description of Shape Measuring Apparatus)

Figure 1:
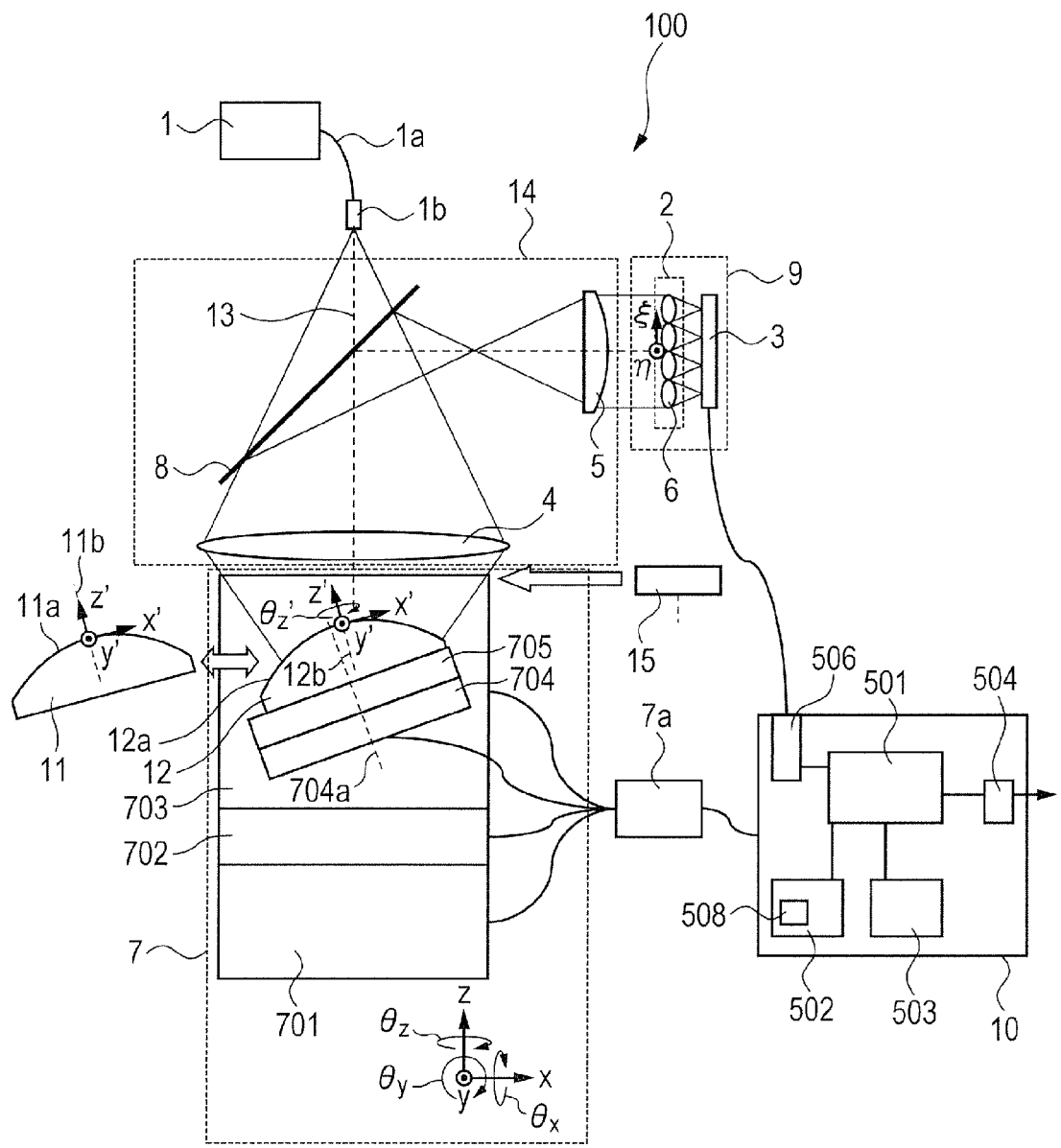
FIG. 1 is a schematic diagram illustrating a shape measuring apparatus according to a first embodiment of the present invention.

FIG. 1 is a schematic diagram illustrating a shape measuring apparatus according to a first embodiment of the present invention. In the first embodiment, an object is an object lens (lens) 12 that is an optical element having an aspheric surface with revolution symmetry that has a wide angle (for example, 30° or more).

The object lens 12 is manufactured by a manufacturing method in which the object lens 12 is molded by an unshown molding apparatus, and thereafter undergoes inspecting in which the shape of an object surface 12a is measured by a shape measuring apparatus 100 illustrated in FIG. 1 and inspection of the object lens 12 is carried out using the measurement result. In the inspecting, a human or a computer determines whether the object lens 12 passes or fails based on the measurement results. Furthermore, thereafter, corrective polishing may also be performed to correctively polish the object surface 12*a* by means of an unshown polishing apparatus based on the measurement result.

The object lens 12 shown in FIG. 1 has the object surface 12*a* that is a convex aspheric surface based on a symmetric design shape $z'_0$ (x', y') with respect to an aspheric axis 12*b*. The shape measuring apparatus 100 measures the shape of the object surface 12*a* of the object lens 12 $z'_s$ (x', y'). Wherein, directions perpendicular to the aspheric axis 12*b* are x' direction and y' direction. a position of the aspheric axis 12*b* is x'=y'=0. And, a direction in parallel to the aspheric axis 12*b* is z' direction. $z'_0$ and $z'_s$ denote positions in the z' direction. When measuring the object surface 12*a*, a reference lens 11 that is a reference object on which a reference surface 11*a* is formed is used as a reference. In order to serve as a reference for the object surface 12*a*, the reference surface 11*a* is formed based on the design shape $z'_0$(x', y') of the object surface 12*a*.

The shape measuring apparatus 100 includes a light source 1, lenses 4 and 5, a stage apparatus 7, a stage controller (hereunder, referred to simply as "controller") 7*a*, a half mirror 8, a detecting unit 9 having a detection surface, a controlling unit (processing unit) 10 and a length measuring machine 15.

The lens 4 is included in an optical system for illuminating the reference surface 11*a* or the object surface 12*a* by means of illuminating light of the light source 1. Further, the lenses 4 and 5 and the half mirror 8 are included in an optical system 14 that guides reflected light from the object surface 12*a* of the object lens 12 to the detecting unit 9.

The stage apparatus 7 can drive the reference lens 11 (reference surface 11*a*) or object lens 12 (object surface 12*a*) in six axial directions, namely, x, y, z, $\theta_x$, $\theta_y$ and $\theta_z$ directions that are defined in FIG. 1, based on a command from the controller 7*a*.

The processing unit 10 performs control of the controller 7*a* to generate commands to be output to the stage apparatus 7. That is, the processing unit 10 controls driving (operation) of the stage apparatus 7 through the controller 7*a*.

The stage apparatus 7 includes a holding base 705 that holds the reference lens 11 or the object lens 12, an xyz stage 701 that drives in the xyz directions, a stage 702 that drives in the $\theta_x$ direction, a stage 703 that drives in the $\theta_y$ direction, and a rotary stage 704.

The rotary stage 704 is a first stage that, among the six axial directions that are three linear axial directions and three rotational axial directions, scans the mounted object lens 12 (or reference lens 11) in a rotational direction that is centered on a rotational axis 704*a* that is a drive direction. The stages 701 to 703 are second stages that move the object lens 12 (or the reference lens 11) in directions that are different to the drive direction of the rotary stage 704, that is, the remaining five axial directions.

More specifically, the rotary stage 704 is a stage that rotates around the rotational axis 704*a*, and is mounted on the stage 703. When the stage 702 and the stage 703 are not inclined, the rotational axis 704*a* is disposed parallel to the z axis, and the rotary stage 704 drives the reference lens 11 or the object lens 12 in the $\theta_z$ direction. The holding base 705 includes a positioning mechanism such as a pin (not illustrated) that butts against a side face of the reference lens 11 or a side face of the object lens 12, or a mark-off line (not illustrated) as a mark. By this means, the holding base 705 can hold the object lens 12 or the reference lens 11 in a state in which the aspheric axis 12*b* of the object lens 12 or the aspheric axis 11*b* of the reference lens 11 matches the rotational axis 704*a* as much as possible. Note that, the above stage configuration is an example of one form of the stage configuration, and the present invention is not limited thereto as long as a form is adopted which can drive the reference surface 11*a* or the object surface 12*a* in six axial directions, namely, the x, y, z, $\theta_x$, $\theta_y$ and $\theta_z$ directions.

The light source 1 is, for example, a monochrome laser. However, the light source 1 may also be a light emitting diode or the like. The light source 1 outputs an illuminating light that is a measuring beam. The illuminating light from the light source 1 is emitted from a fiber connector 1*b* through a single-mode fiber 1*a* as an axially symmetric spherical wave with respect to a measuring beam axis 13, passes through the half mirror 8, and is transmitted through the lens 4 and becomes axially symmetric convergent light with respect to the measuring beam axis 13. The convergent light is reflected at the reference surface 11*a* or object surface 12*a*. The reflected light that is reflected at the reference surface 11*a* or object surface 12*a* is transmitted through the lens 4, reflected by the half mirror 8, converted into approximately parallel light at the lens 5, and is incident on the detecting unit 9. At this time, reflected light from the reference surface 11*a* or the object surface 12*a* is imaged onto the detecting unit 9 by the lenses 4 and 5 and the half mirror 8. The imaging optical system 14 is formed by the aforementioned elements 4, 5 and 8. The detecting unit 9 and the imaging optical system 14 serve as means for measuring a wavefront of reflected light from the reference surface 11*a* or object surface 12*a*.

The distance between the lens 4 and the object lens 12 is set so that light from the lens 4 converges in the vicinity of the center of curvature of a paraxial region of the object surface 12*a*. However, an angle of light that is reflected at the object surface 12*a* depends on an aspheric amount (deviation from a sphere) or s shape error of the object surface 12*a*. Therefore, in a case where the aspheric amount of the object surface 12*a* is large, an angle of light that is reflected at the object surface 12*a* is an angle that differs significantly from an angle of light that is incident on the object surface 12*a*.

Although the length measuring machine 15 is usually mounted at a position at which the length measuring machine 15 does not obstruct incident light onto the reference surface 11*a* or object surface 12*a* or reflected light from these surfaces, the length measuring machine 15 is inserted between the object surface 12*a* and the lens 4 when performing measurement of the position thereof in the z direction of the object surface 12*a*. After insertion, the length measuring machine 15 measures a position in the z direction of a point at which the object surface 12*a* and the measuring beam axis 13 intersect. With regard to the form of the length measuring machine 15, for example, a machine that uses principles of triangulation may be adopted, or another form such as a white light interferometer or a laser length measuring machine may be adopted.

The detecting unit 9 includes a wavefront sensor, for example, a Shack-Hartmann sensor. A Shack-Hartmann sensor has good compatibility with digital data processing, and the detecting unit 9 can be made simply and at a low cost by employing a Shack-Hartmann sensor. The detecting unit 9 formed by a Shack-Hartmann sensor includes a microlens array 2 in which a large number of microlenses 6 are arranged in a matrix shape, and a light-receiving sensor 3 that is formed of a two-dimensional optical sensor, for example, a CCD sensor. Light that is incident on the detecting unit 9 is divided at the respective microlenses 6 when transmitted through the microlens array 2, and is converged on the light-receiving sensor 3. The distribution of angles of light rays that are incident on the light-receiving sensor 3 that forms the detection surface of the detecting unit 9 can be determined by detecting a difference between positions of spots that are condensed with the microlenses 6 and the respective optical axis positions of the microlenses 6. With regard to the respective optical axis positions of the microlenses 6, for example, the positions are calibrated in advance by measuring spot positions when parallel light rays are made incident on the microlenses 6.

In general, when light is thought of as an electromagnetic wave, a wavefront of light is an equiphase wave surface, and is obtained by subjecting a light ray angle distribution that is obtained with a Shack-Hartmann sensor to a two-dimensional integration. Here, normal to the equiphase wave surface is light ray, and the equiphase wave surface and light ray angle distribution correspond one-to-one. Accordingly, detection of the light ray angle distribution that is incident on the light-receiving sensor 3 of the detecting unit 9 is equivalent to detection of the equiphase wave surface, and can be considered to be equivalent to detection of the wavefront.

Further, the detection surface of the detecting unit 9 that is formed of a wavefront sensor is placed on an imaging plane formed by the imaging optical system 14. That is, the detecting unit 9 and the object surface 12a are at appositions conjugate to each other. On the detection surface of the detecting unit 9, a position conjugate with an intersecting point between the measuring beam axis 13 and the object surface 12a or the reference surface 11a is taken as an origin, and a ($\xi$, $\eta$) coordinate system as shown in FIG. 1 is defined. Note that the detecting unit 9 is not limited to a Shack-Hartmann sensor, and any sensor that can detect a wavefront or a light ray angle distribution can be used as the detecting unit 9. For example, the detecting unit 9 may be a shearing interferometer that uses a diffraction grating and a CCD sensor, or a Talbot interferometer. Further, by adopting a configuration in which the detecting unit 9 is simply a light-receiving sensor, and a Fizeau interferometer including a reference surface is provided between the lens 4 and the object lens 12, a wavefront of reflected light from the object surface 12a may be detected as an interference fringe.

The processing unit 10 as the controlling unit includes a computer, and has a CPU 501, memories such as a ROM 502 and a RAM 503, and a frame grabber 506. A program 508 is stored in the ROM 502. An output signal of the light-receiving sensor 3 of the detecting unit 9 is input to the frame grabber 506 to form image data, and the image data is output to the CPU 501. Further, the CPU 501 outputs position control information with respect to the reference lens 11 or object lens 12 to the controller 7a.

Based on a detection result at the detecting unit 9, the CPU 501 of the processing unit 10 executes processing (measurement processing) for determining the surface shape of the object surface 12a, that is, respective processes of a shape measuring method, in accordance with the program 508. Information relating to the arrangement of the fiber connector 1b, the arrangement of the detecting unit 9, and the shape and arrangement of the lenses 4 and 5 and the half mirror 8 that are included in the imaging optical system 14 is necessary to perform measurement processing. This data is stored in advance in, for example, a predetermined region of the ROM 502 (or RAM 503). In addition, the processing unit 10 has a communicating unit 504 that includes, for example, a network interface according to the IEEE 802.3 standard. The CPU 501 can transmit, for example, a shape measurement result for the object surface 12a that is described later or an evaluation result for the object lens 12 that is based thereon through the communicating unit 504 to another device of a manufacturing plant in which the shape measuring apparatus 100 is installed.

Note that, although in the first embodiment a case is described in which a computer-readable recording medium is the ROM 502, and the program 508 is stored in the ROM 502, the present invention is not limited thereto. The program 508 may be recorded on any kind of recording medium as long as the recording medium can be read by a computer. For example, the RAM 503, a recording disk that is not illustrated in the drawings, or an external memory that is not illustrated in the drawings may also be used as a recording medium for supplying the program 508. More specifically, a flexible disk, a hard disk, an optical disk, a magneto-optical disk, a CD-ROM, a CD-R, a magnetic tape or a non-volatile memory or the like can be used as the recording medium.

The reference lens 11 is a lens that is fabricated so as to have the same design value and the same design shape as the object lens 12. The reference surface 11a that is formed on the reference lens 11 is measured with high accuracy beforehand by another measurement apparatus, such as a probe-type measurement apparatus, that is different to the shape measuring apparatus 100. Shape data $z'_b(x', y')$ for the reference surface 11a that is measured is stored in advance in the ROM 502 (or RAM 503).

(Outline of Stitching Measurement and Description of Arrangement of Partial Regions)

The object surface 12a in the first embodiment is a convex aspheric surface that is formed as the lens 12 with a wide angle.

For example, to measure this surface shape at one time, it would be necessary to illuminate the whole object surface with convergent light with a wide converging angle. However, in such a case it would be difficult to maintain the conjugate relation between the object surface and the detecting unit, and the aspheric amount of the aspheric surface that could be measured would be limited. Further, it would be necessary to use a lens with a large area as a lens (for example, the lens 4) for projecting light onto the object surface, and consequently the apparatus cost would increase.

Therefore, in the first embodiment, a converging angle of measuring beam with which the object surface 12a is irradiated is suppressed by suppressing the area and power of the lens 4, and an irradiation area irradiated with a measuring beam is less than the area of the object surface 12a. That is, the area of the object surface 12a is larger than the irradiation area of a measuring beam from the light source 1.

At a time of measurement, by controlling the stage apparatus 7, the CPU 501 of the processing unit 10 sequentially irradiates a measuring beam onto a plurality of partial regions of the object surface 12a while scanning the object lens 12 with the stage apparatus 7, and acquires a wavefront of reflected light from the respective partial regions using the detecting unit 9. The CPU 501 calculates partial shape data based on the data for the wavefront of the reflected light from the respective partial regions, and forms shape data for the whole of the object surface 12a by stitching the respective items of partial shape data. In the first embodiment, a case is described in which the radius of partial regions that are illuminated en bloc is approximately ⅔ the size of the radius of the object surface 12a.

Figure 2A:
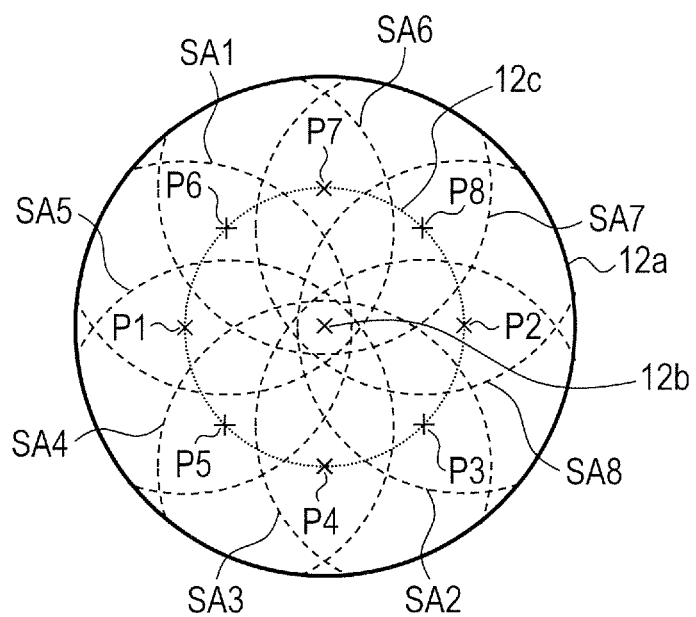
FIG. 2A is an explanatory diagram illustrating the arrangement of partial regions on an object surface of an object lens in the first embodiment of the present invention.

FIG. 2A is an explanatory diagram illustrating the arrangement of partial regions on the object surface of the object lens in the first embodiment. In this case, a circle 12c whose radius $r_0$ is approximately half the size of the radius of the object surface 12a when taking the aspheric axis 12b of the object lens 12 as the center will be considered. Centers P1 to P8 of respective partial regions SA1 to SA8 are arranged on the circle 12c, and the respective partial regions SA1 to SA8 are arranged at positions that are rotated by 45° each around the aspheric axis 12b. When measuring the respective partial regions SA1 to SA8, the centers P1 to P8 of the respective partial regions SA1 to SA8 are in line with the measuring beam axis 13.

That is, a trajectory (ideal trajectory) of the object surface 12a such that the measuring beam axis 13 passes through the centers 21 to P8 of the respective partial regions SA1 to SA8 is previously set in the processing unit 10 (ROM 502 or RAM 503). Specifically, as the trajectory of the object surface 12a, data of ideal positions in terms of the design (design positions) of the object surface 12a when the measuring beam axis 13 is in line with the centers P1 to P8 of the respective partial regions SA1 to SA8 is stored in advance in the ROM 502 or RAM 503. If the partial regions SA1 to SA8 are arranged as shown in FIG. 2A, shape data for the whole object surface 12a can be obtained by stitching the respective items of partial shape data.

Further, the partial regions SA1 to SA8 are arranged along a $\theta'_z$ direction around the aspheric axis 12b that is the axis of symmetry of the object surface 12a so as to run along the trajectory of the object surface 12a. The rotational axis 704a of the rotary stage 704 approximately matches the aspheric axis 12b that is the axis of symmetry of the object surface 12a. Accordingly, by driving the rotary stage 704, it is possible to rotate the object surface 12a approximately around the aspheric axis 12b, and to switch a partial region to be measured while roughly maintaining the relation between the measuring beam axis 13 and the aspheric axis 12b of the object lens 12.

Figure 2B:
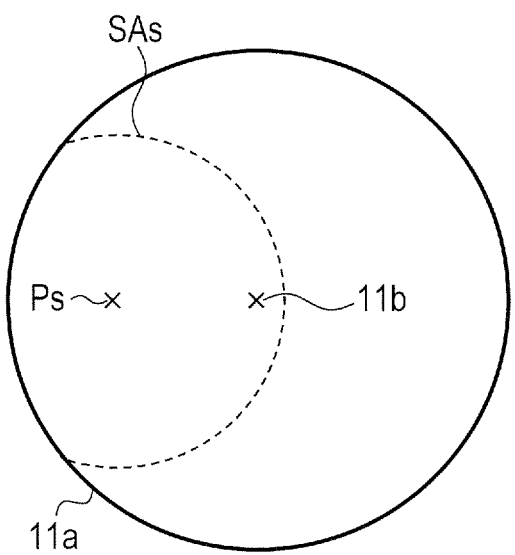
FIG. 2B is an explanatory diagram illustrating the arrangement of partial regions on a reference surface of a reference lens in the first embodiment of the present invention.

FIG. 2B is an explanatory diagram illustrating the arrangement of a partial region on the reference surface of the reference lens in the first embodiment. Since the design shape of the partial region is common with that of the partial regions SA1 to SA8 of the object surface 12a, a systematic error that arises when measuring the respective shapes is also common between the reference surface and the object surface 12a. Consequently, measurement of a wavefront of reflected light from the reference surface 11a that is necessary for correcting the systematic error need only be performed once with respect to reflected light from a partial region SAs that is centered on a point Ps that is separated from the aspheric axis 12b by the amount of the radius of the circle 12c. When measuring the reference surface 11a, the center Ps of the partial region is in line with the measuring beam axis 13.

Although in the first embodiment a case is described of stitching shape data for eight partial regions SA1 to SA8, the number of partial regions is not limited thereto. When it is desired to improve the measurement accuracy, the number of partial regions may be increased, while the number of partial regions may be decreased when it is desired to shorten the measurement time.

(Description of Measurement Procedures in Part Units)

Figure 3:
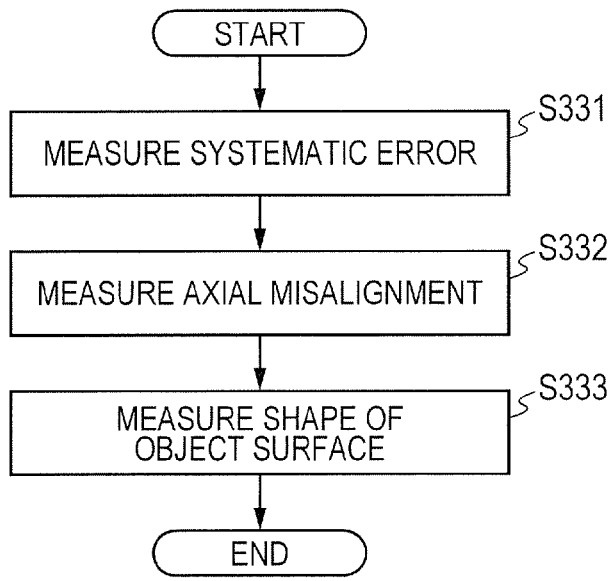
FIG. 3 is a flowchart illustrating a shape measuring method according to the first embodiment of the present invention.

FIG. 3 is a flowchart illustrating the shape measuring method according to the first embodiment of the present invention. The CPU 501 reads out the program 508, and executes the respective processes of the shape measuring method. The shape measuring method is broadly divided into three processes, namely, a part S331 of measuring a systematic error, a part S332 of measuring a misalignment between the aspheric axis 12b and the rotational axis 704a, and a part S333 of measuring the shape of the object surface 12a. First, measurement procedures in the first embodiment will be described in part units in accordance with the flowchart in FIG. 3.

In the part S331, the CPU 501 uses the detecting unit 9 to detect a wavefront of reflected light from the reference surface 11a whose shape is known, and calculates data regarding a systematic error of the shape measuring apparatus 100 based on the detection result. The systematic error includes an aberration of the imaging optical system 14 and an error of the detecting unit 9. That is, the systematic error is included in a detection result of the detecting unit 9. And, it is not necessary to execute the part S331 at all times of measuring new object lens. The part S331 may be executed periodically in time with a changing period of the systematic error.

In the part S332, the CPU 501 measures an axial misalignment quantity between the aspheric axis 12b and the rotational axis 704a. In this part S332, the CPU 501 measures the respective wavefronts of reflected light from the object surface 12a at a plurality of positions (at least two positions) while rotating the rotary stage 704, and calculates an axial misalignment quantity (size of an axial misalignment) based on these wavefronts.

In the part S333, the CPU 501 uses the detecting unit 9 to detect a wavefront of reflected light from the object surface 12a, and using the systematic error data acquired in the part S331, calculates shape data of the object surface in which the systematic error is corrected.

In this case, to ensure that the systematic error is accurately corrected, it is necessary that reflected light from the object surface 12a passes along the optical path which the reflected light from the reference surface 11a passes along in the part S331. To achieve this, when performing shape measurement for all of the partial regions, it is necessary for the object surface 12a to be placed at the same position as the reference surface 11a during the systematic error measuring (S331). However, due to a reason such as misalignment of the positioning mechanism of the holding base 705 or a mismatch between the center of the external shape of the lens 12 and the aspheric axis 12b, a misalignment arises between the aspheric axis 12b and the rotational axis 704a that is of an amount of several tens to several hundred μm with respect to the position or several hundred μrad with respect to the angle. If such a misalignment exists, even if the object surface 12a is placed once at the same position as the reference surface 11a in the part S331, the aspheric axis 12b will move when the rotary stage 704 is rotated thereafter to switch the measurement region, and the object surface 12a will be placed in a misaligned state.

Therefore, in the part S333, each time the rotary stage 704 is rotated to switch the measurement region, the CPU 501 drives the stages 701 to 703 to correct the placement error of the object surface 12a. That is, the CPU 501 aligns the object surface 12a.

In this case, in order to align the object surface 12a it is necessary to quantitatively determine a placement error with respect to the trajectory of the object surface 12a.

In Japanese Patent Application Laid-Open No. 2013-186017, as technology for determining a placement error of an object surface, technology is disclosed for determining placement errors in the x, y, $\theta_z$, and $\theta_y$ directions by measuring a wavefront of reflected light, and technology is disclosed for measuring a placement error in the z direction with a length measuring machine. However, a large amount of time will be required if such kind of placement error measurement is carried out for each shape measurement of the respective partial regions SA1 to SA8.

It is considered that the principal cause of a placement error is axial misalignment between the aspheric axis 12b and the rotational axis 704a. Accordingly, if such an axial misalignment quantity is known, a placement error of the object surface 12a after rotating the rotary stage 704 can be estimated without directly measuring the placement error.

In the part S333, based on the calculated axial misalignment quantity (size of the axial misalignment), the CPU 501 estimates a placement error after rotation of the rotary stage 704, and performs alignment of the object surface 12a based on the estimated result. When this method is adopted, the shape of the object surface 12a can be acquired over the whole surface thereof in a short time because it is not necessary to measure the position of the object surface 12a each time the shape of a partial region is measured, that is, it is not necessary to actually measure placement errors for each of the partial regions SA1 to SA8.

(Description in Step Units of Measurement Procedures in Part S331)

Figure 4:
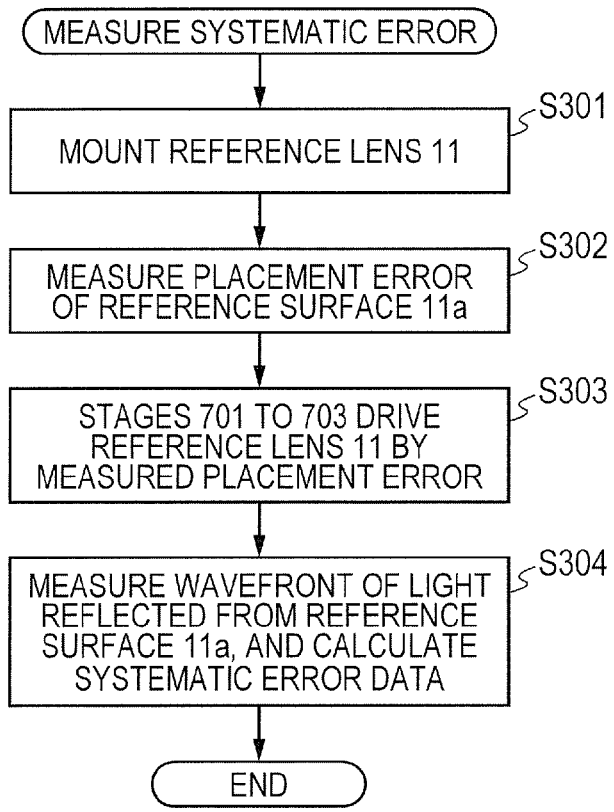
FIG. 4 is a flowchart illustrating procedures for measuring a systematic error in the shape measuring method according to the first embodiment of the present invention.

FIG. 4 is a flowchart illustrating procedures for measuring a systematic error in the part S331. Hereunder, measurement procedures of the first embodiment will be described in detail in step units in accordance with the flowchart in FIG. 4.

First, a worker mounts the reference lens 11 on the holding base 705 (S301). This operation may also be performed automatically using a robot hand that is not illustrated in the drawings. At this time, the ideal placement is one in which the partial region SAs is placed so as to be perpendicular with respect to the measuring beam axis 13 on a conjugate plane of the detecting unit 9 in a state in which the center Ps thereof is in line with the measuring beam axis 13.

More specifically, the state is one in which an intersecting point between the reference surface 11a and the aspheric axis 11b is at a position that is misaligned by $-r_0$ in the x direction relative to the measuring beam axis 13, and the aspheric axis 11b is inclined by an angle $\Theta$ that is expressed by equation (1) in the $\theta_y$ direction relative to the measuring beam axis 13. Hereunder, this state is referred to as a state in which the reference surface 11a is placed in a "design position".

$$\Theta = \operatorname{Tan}^{-1}\left(\frac{dz'_0(x', y')}{dx'}\right)\bigg|_{x'=r_0, y'=0} \quad \text{equation (1)}$$

Therefore, the aspheric axis 11b of the reference surface 11a inclines by approximately the angle $\Theta$ in the $\theta_y$ direction relative to the measuring beam axis 13, and the stages 703 and 702 are respectively driven so that the inclination angle becomes approximately 0 in the $\theta_z$ direction. The reference lens 11 is driven in the xyz direction by the stage 701 so that the center Ps of the partial region SAs is approximately in line with the measuring beam axis 13 and is placed approximately over the conjugate plane of the detecting unit 9.

However, according to this method the reference surface 11a is only mounted with machine accuracy, and a placement error of several tens to several hundreds of μm in terms of the xyz direction and around several hundreds of μrad in terms of the angle arises with respect to the design position.

Therefore, the CPU 501 acquires, from the detecting unit 9, data for a wavefront of reflected light from the reference surface 11a that is detected by the detecting unit 9, and based on the data for the wavefront the CPU 501 measures (actually measures) a placement error with regard to the design position of the reference surface 11a (S302: error measuring).

Specifically, with regard to a case in which the reference surface 11a is placed at the design position, first, the CPU 501 calculates an equiphase wave surface of reflected light $w_0$ ($\xi$, $\eta$) formed at the detecting unit 9. At such time, the CPU 501 performs ray tracing from the fiber connector 1b to the detecting unit 9 based on information regarding the fiber connector 1b, the imaging optical system 14, the reference surface 11a and the detecting unit 9 that is stored in the ROM 502 (or the RAM 503), and calculates the equiphase wave surface at the detecting unit 9. Design shape data $z'_0$ and data regarding the design position of the reference surface 11a is used as the information regarding the reference surface 11a in this case. It is noted that, as the shape data of the reference surface 11a, the above described shape data $z'_b$ measured by the other measuring apparatus may be used.

Next, when the placement of the reference surface 11a changes by a unit amount in the x, y, z, $\theta_x$ and $\theta_y$ directions, by performing ray tracing in a similar manner to that described above, the CPU 501 calculates respective changes $\Delta w_x$ ($\xi$, $\eta$), $\Delta w_y$ ($\xi$, $\eta$), $\Delta w_z$ ($\xi$, $\eta$), $\Delta w_{\theta x}$ ($\xi$, $\eta$) and $\Delta w_{\theta y}$ ($\xi$, $\eta$) of the reflected light wavefront at the detecting unit 9. Although in the first embodiment a case is described in which ray tracing is performed after setting the center of rotation when moving the reference surface 11a in the $\theta_x$ and $\theta_y$ directions so as to be centered on an intersecting point between the measuring beam axis 13 and the reference surface 11a that is placed at the design position, the center of rotation may be set to a different position thereto. Calculation of the above described wavefront data w, $\Delta w_x$, $\Delta w_y$, $\Delta w_z$, $\Delta w_{\theta x}$, and $\Delta w_{\theta y}$ may also be performed before starting measurement, and in such a case the calculated wavefront data is stored in the ROM 502 (or RAM 503) of the processing unit 10. In addition, an equiphase wave surface w' ($\xi$, $\eta$) of reflected light from the reference surface is detected with the detecting unit 9. Thereafter, the CPU 501 calculates placement errors $\Delta x_b$, $\Delta y_b$, $\Delta z_b$, $\Delta \theta_{x,b}$ and $\Delta \theta_{y,b}$ so that $\Delta_b$ that is defined by equation (2) becomes a minimum value. In this case, the placement errors $\Delta x_b$ and $\Delta y_b$ are error components in x and y directions, respectively, that are perpendicular to the travelling direction of the measuring beam. The placement error $\Delta z_b$ is an error component in a z direction, that is parallel to the travelling direction of the measuring beam. The placement errors $\Delta \theta_{x,b}$ and $\Delta \theta_{y,b}$ are error components in $\theta_x$ and $\theta_y$ directions, respectively, corresponding to the inclination of the aspheric axis 12b of the object surface 12a.

$$\Delta_b = \iint (w'(\xi,\eta) - w_0(\xi,\eta) - \Delta w_x(\xi,\eta)\Delta x_b - \Delta w_y(\xi,\eta)\Delta y_b - \Delta w_z(\xi,\eta)\Delta z_b - \Delta w_{\theta x}(\xi,\eta)\Delta \theta_{x,b} - \Delta w \theta y(\xi,\eta)\Delta \theta_{y,b}) \, d\xi d\eta \quad \text{equation (2)}$$

It is noted that the placement error $\Delta z_b$ may be measured by inserting the length measuring machine 15 between the lens 4 and the object surface 12a. And, a change of a wavefront may be obtained, as $\Delta w_x$, $\Delta w_y$, $\Delta w_z$, $\Delta w_{\theta x}$, $\Delta w_{\theta y}$, by measuring wavefronts actually before and after moving the reference surface 11a by unit quantity and comparing them.

The CPU 501 drives the stages 701 to 703 by amounts corresponding to placement errors calculated in step S302 so as to cancel out the placement errors (S303). At this time, when the reference surface 11a is inclined by $\Delta\theta_{x,b}$ and $\Delta\theta_{y,b}$ in the $\theta_x$ and $\theta_y$ directions, respectively, similarly to the settings when $\Delta w_{\theta x}$ and $\Delta w_{\theta y}$ are calculated in step S301, it is necessary to make an intersecting point between the measuring beam axis 13 and the reference surface 11a the center of rotation. However, the center of rotation of the stage 702 and the stage 703 does not necessarily match the intersecting point. If the stage 702 and the stage 703 are driven in a state in which the two centers of rotation are not on the intersecting point, in addition to inclining by $\Delta\theta_{x,b}$ and $\Delta\theta_{y,b}$ in the $\theta_x$ and $\theta_y$ directions, respectively, the reference surface 11a also exhibits an unnecessary movement in the xyz directions. Therefore, in addition to driving the stage 701 by $\Delta x_b$, $\Delta y_b$ and $\Delta z_b$ in the xyz directions, respectively, driving of the stage 701 to correct the unnecessary movement due to the aforementioned mismatch between the centers of rotation and the intersecting point is performed. In addition, the stage 702 and stage 703 incline by $\Delta\theta_{x,b}$ and $\Delta\theta_{y,b}$ in the $\theta_x$ and $\theta_y$ directions, respectively. By driving the stages in this way, the reference surface 11a is placed at the design position. That is, the CPU 501 controls the stages 701 to 703 to positions that cancel out placement errors determined in step S302 to thereby align the reference surface 11a (reference surface aligning).

Next, after step S303, the CPU 501 determines shape data based on a wavefront of reflected light from the reference surface 11a that is detected by the detecting unit 9, and determines a systematic error by acquiring a difference between the shape data and shape data that is acquired with another apparatus (S304: systematic error calculating).

That is, in step S304, first, the CPU 501 uses the detecting unit 9 to detect a light ray angle distribution with respect to reflected light from the partial region SAs of the reference surface 11a. Next, the CPU 501 performs ray tracing in the opposite direction from the aforementioned light ray angle distribution, and calculates distributions $s_{x,out}(x',y')$ and $s_{y,out}(x',y')$ of the inclination of light rays to the z' direction in the x' and y' directions, respectively, immediately after reference surface reflection. In addition, the CPU 501 calculates an inclination distribution $(dz'_b(x',y')/dx', dz'_b(x',y')/dy')$ of the reference surface 11a with equation (3).

$$\frac{dz''_b(x',y')}{dx'} = \left(\frac{s_{x,out}}{\sqrt{s_{x,out}^2+s_{y,out}^2+1}} - \frac{s_{x,in}}{\sqrt{s_{x,in}^2+s_{y,in}^2+1}}\right) /$$
$$\left(\frac{1}{\sqrt{s_{x,out}^2+s_{y,out}^2+1}} - \frac{1}{\sqrt{s_{x,in}^2+s_{y,in}^2+1}}\right)$$

$$\frac{dz''_b(x',y')}{dy'} = \left(\frac{s_{y,out}}{\sqrt{s_{x,out}^2+s_{y,out}^2+1}} - \frac{s_{y,in}}{\sqrt{s_{x,in}^2+s_{y,in}^2+1}}\right) /$$
$$\left(\frac{1}{\sqrt{s_{x,out}^2+s_{y,out}^2+1}} - \frac{1}{\sqrt{s_{x,in}^2+s_{y,in}^2+1}}\right)$$

equation (3)

In this case, $s_{x,in}(x',y')$ and $s_{y,in}(x',y')$ are distributions of the inclination to the z' direction in the x' and y' directions, respectively, of light rays incident on the reference surface 11a. These values are calculated in advance based on the shape and placement of the lens 4, and are stored in the ROM 502 (or RAM 503). Thereafter, the CPU 501 integrates the inclination angle distribution $(dz'_b(x',y')/dx', dz'_b(x',y')/dy')$ of the reference surface over two dimensions and calculates shape data $z'_b(x',y')$ of the reference surface 11a. The shape data includes information of a systematic error $\Delta z'_{sys}(x',y')$ of the shape measuring apparatus 100 in addition to information for the reference surface shape. Therefore, the CPU 501 extracts the information of the systematic error using equation (4).

$$\Delta z'_{sys}(x',y') = z''_b(x',y') - z'_b(x',y')$$

equation (4)

Thus, processing of the part S331 for measuring a systematic error is completed.

(Description in Step Units of Measurement Procedures in Part S332)

Figure 5:
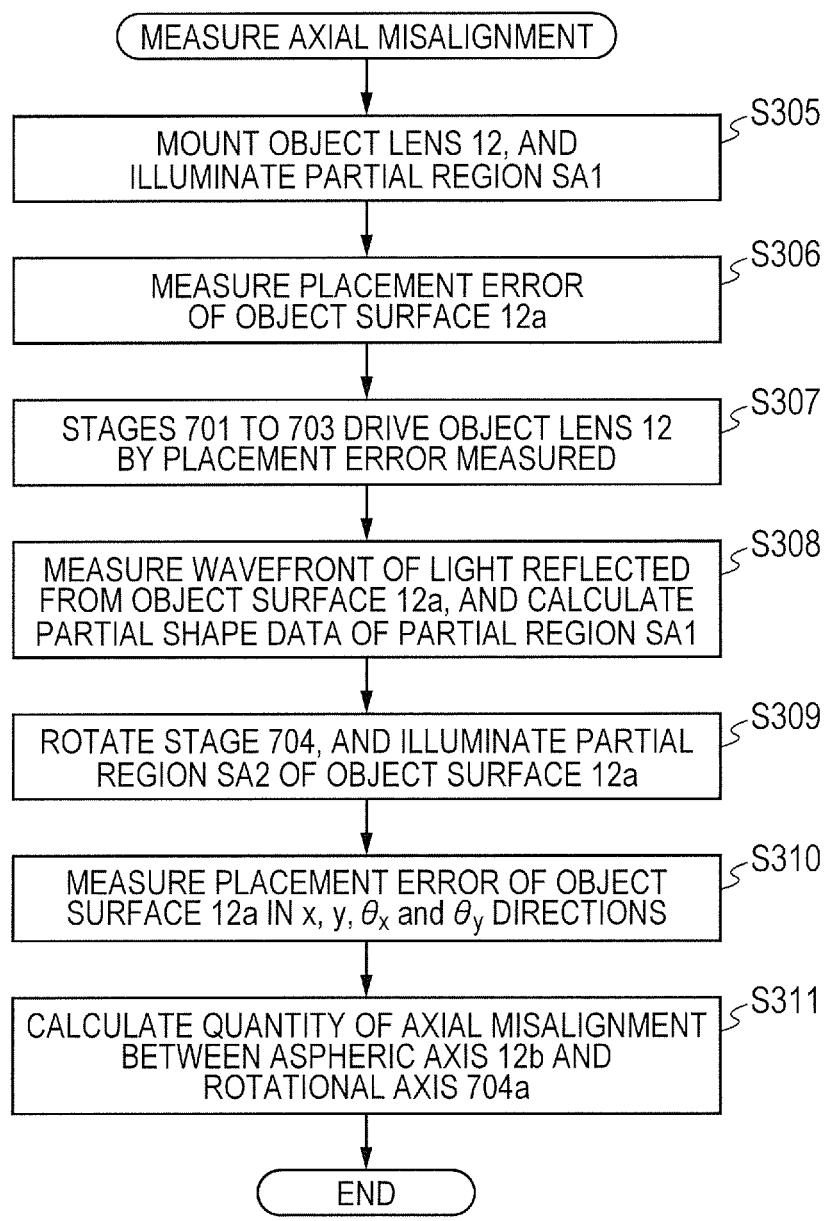
FIG. 5 is a flowchart illustrating procedures for measuring an axial misalignment in the shape measuring method according to the first embodiment of the present invention.

FIG. 5 is a flowchart illustrating procedures for measuring an axial misalignment in the part S332. Hereunder, measurement procedures of the first embodiment will be described in detail in step units in accordance with the flowchart in FIG. 5.

The worker removes the reference lens 11 from the holding base 705, and mounts the object lens 12 instead (S305). This operation may also be performed automatically using a robot hand that is not illustrated in the drawings. At this time, the CPU 501 rotates the rotary stage 704 to a predetermined rotational position to move the object surface 12a (moving). That is, the CPU 501 controls the position of the rotary stage 704 to one measurement position among eight measurement positions along the rotational direction of the rotary stage 704 that is moved when detecting a wavefront of reflected light in each of the partial regions SA1 to SA8 by means of the detecting unit 9. In the first embodiment, the CPU 501 controls the position (measurement position) of the rotary stage 704 to the position thereof when measuring the shape of the partial region SA1. The aforementioned measurement position is 0 [rad]. At this time also, similarly to a time that the reference lens 11 is mounted, the object lens 12 is placed as close as possible to the design position utilizing the positioning mechanism of the holding base 705. However, at the time point at which step S305 is completed, due to an error of the aforementioned positioning mechanism or the like, the object surface 12a is not necessarily placed accurately at the design position, that is, at the same position as the reference surface 11a is mounted in step S303.

In the first embodiment, the CPU 501 actually measures a placement error with respect to the trajectory (design position) of the object surface 12a at the measurement position (0 [rad]) of the rotary stage 704 when measuring the shape of the partial region SA1 of the object surface 12a (S306: actual measuring). The placement errors $\Delta x_{s,1}$, $\Delta y_{s,1}$, $\Delta\theta_{x,s,1}$ and $\Delta\theta_{y,s,1}$ in the x, y, $\theta_x$ and $\theta_y$ directions are detected on the basis of reflected light from the object surface 12a. That is, the CPU 501 detects an equiphase wave surface $w(\xi,\eta)$ of reflected light from the object surface 12a with the detecting unit 9 and calculates placement errors $\Delta x_{s,1}$, $\Delta y_{s,1}$, $\Delta\theta_{x,s,1}$ and $\Delta\theta_{y,s,1}$ that make $\Delta_s$ a minimum with equation (5). The placement errors $\Delta x_{s,1}$ and $\Delta y_{s,1}$ are error components in a direction perpendicular to the travelling direction of the measuring beam, and the placement errors $\Delta\theta_{x,s,1}$ and $\Delta\theta_{y,s,1}$ are inclination error components of the aspheric axis 12b of the object surface 12a.

$$\Delta_s = \iint (w(\xi,\eta) - w_0(\xi,\eta) - \Delta w_x(\xi,\eta)\Delta x_{s,1} - \Delta w_y(\xi,\eta)\Delta y_{s,1} - \Delta w_{\theta x}(\xi,\eta)\Delta\theta_{x,s,1} - \Delta w_{\theta y}(\xi,\eta)\Delta\theta_{y,s,1})d\xi d\eta$$

equation (5)

Here, $w_0$, $\Delta w_x$, $\Delta w_y$, $\Delta w_{\theta x}$ and $\Delta w_{\theta y}$ are included in equation (5) that is used to calculate placement errors of the object surface 12a. Although these parameters are data that is calculated based on the design shape $z'_0$ of the reference surface 11a for the purpose of calculating placement errors of the reference surface 11a, the design shape of the object surface 12a is common with the design shape $z'_0$ of the reference surface 11a. Accordingly, these parameters can also be applied to calculation of a placement error of the object surface 12a.

With respect to a placement error $\Delta z_{s,1}$ in the z direction that is an error component that is parallel to the travelling direction of the measuring beam, the placement error is measured by inserting the length measuring machine 15 between the lens 4 and the object surface 12a. The relation between a zero point of the length measuring machine 15 and the design position is calibrated in advance. By this means the current misalignment in the z direction of the object surface 12a with respect to the design position can be detected with the length measuring machine 15.

The CPU 501 drives the stages 701 to 703 to move the object lens 12 to a position that cancels out placement errors by the amounts of $-\Delta x_{s,1}$, $-\Delta y_{s,1}$, $-\Delta z_{s,1}$, $-\Delta \theta_{x,s,1}$ and $-\Delta \theta_{y,s,1}$ in the x, y, z, $\theta_x$ and $\theta_y$ directions, respectively. By this means, the CPU 501 places the object surface 12a at the design position (S307). That is, when the rotary stage 704 is controlled to the measurement position (0 [rad]), the CPU 501 performs alignment of the object surface 12a by controlling the stages 701 to 703 to positions at which placement errors of the object surface 12a at the measurement position (0) are cancelled out (aligning).

Next, the CPU 501 calculates partial shape data $z'_{s,1}(x',y')$ for the partial region SA1 of the object surface 12a (S308: partial shape data calculating). At this time, using the data for the systematic error that is calculated in step S304, the CPU 501 corrects the partial shape data that includes the systematic error to calculate the partial shape data $z'_{s,1}(x',y')$.

Next, the CPU 501 rotates the rotary stage 704 $\pi$ [rad], and illuminates the partial region SA2 of the object surface 12a (S309: moving). That is, the CPU 501 controls the rotary stage 704 to the measurement position ($\pi$ [rad]) for a time of measuring the shape of the partial region SA2 of the object surface 12a to thereby move the object surface 12a. When the direction of the rotary stage 704 at the time point of step S307 is taken as $\theta'_z=0$, the direction of the rotary stage 704 at the time point of the present step S309 is $\theta'_z=\pi$.

At this time, if the aspheric axis 12b and the rotational axis 704a were matching, a placement error of the object surface 12a would not occur after rotation also. However, as described above, since there is a misalignment between the two axes 12b and 704a, placement errors again arise with respect to the object surface 12a after rotation.

By a similar method as in step S306, the CPU 501 measures placement errors $\Delta x_s(\theta'_z=\pi)$, $\Delta y_s(\theta'_z=\pi)$, $\Delta_{x,s}(\theta'_z=\pi)$ and $\Delta \theta_{y,s}(\theta'_z=\pi)$ in the x, y, $\theta_x$ and $\theta_y$ directions at this time (S310: actual measuring).

With respect to the aspheric axis 12b and the rotational axis 704a at a time that the partial region SA1 is illuminated, the CPU 501 calculates misalignments $\delta_x$ and $\delta_y$ in the x' and y' directions and inclination angles $\delta_{\theta x}$ and $\delta_{\theta y}$ in the $\theta'_x$ and $\theta'_y$ directions in accordance with equation (6) (S311: estimating).

$\delta_x = \Delta x_s(\pi)/2$ $\delta_y = \Delta y_s(\pi)/2$ $\delta_{\theta x} = \Delta \theta_{x,s}(\pi)/2$ $\delta_{\theta y} = \Delta \theta_{y,s}(\pi)/2$ equation (6)

Thus, by rotating by $\pi$ [rad] from a state in which $\theta'_z=0$[rad] and measuring placement errors, calculation of axial misalignment quantities can be simplified as shown in equation (6), and hence the calculation load is reduced and the calculation time is shortened.

In equation (6), axial misalignment quantities $\delta_x$, $\delta_y$, $\delta_{\theta x}$ and $\delta_{\theta y}$ are calculated based on only placement errors at $\theta'_z=\pi$ that is measured in step S310. However, this equation is based on the premise that, when $\theta'_z=0$, the object surface 12a is placed at the design position in step S307. Placement of the object surface 12a at the design position is performed based on placement errors measured in step S306.

Accordingly, in step S311, the axial misalignment quantities $\delta_x$, $\delta_y$, $\delta_{\theta x}$ and $\delta_{\theta y}$ are calculated based both on placement errors when $\theta'_z=\pi$ that are measured in step S310 and placement errors when $\theta'_z=0$ that are measured in step S306.

In the present embodiment, after measuring a placement error of the object surface 12a at $\theta'_z=0$, a step S307 is executed to drive stages 701 to 703 by an extent of the placement error. However, the step S307 is not necessary at all times. Even without the step 3307, an axial misalignment quantity may be calculated as an average between the placement error at $\theta'_z=0$ and the placement error at $\theta'_z=\pi$. In such case, the step S307 can be simplified. Accordingly, a measuring time can be reduced.

Moreover, after executing the step 3307, the placement error of the object surface 12a may be measured again. And, an average between this measured placement error and the placement error at $\theta'_z=\pi$ may be calculated as the axial misalignment. In such case, since the axial misalignment is calculated taking into consideration the placement error after execution of the step S307, more accurate axial misalignment quantity can be acquired.

Thus, the processing of the part S332 for measuring a misalignment between the aspheric axis 12b and the rotational axis 704a is completed.

(Description in Step Units Regarding Measurement Procedures in Part 3333)

Figure 6:
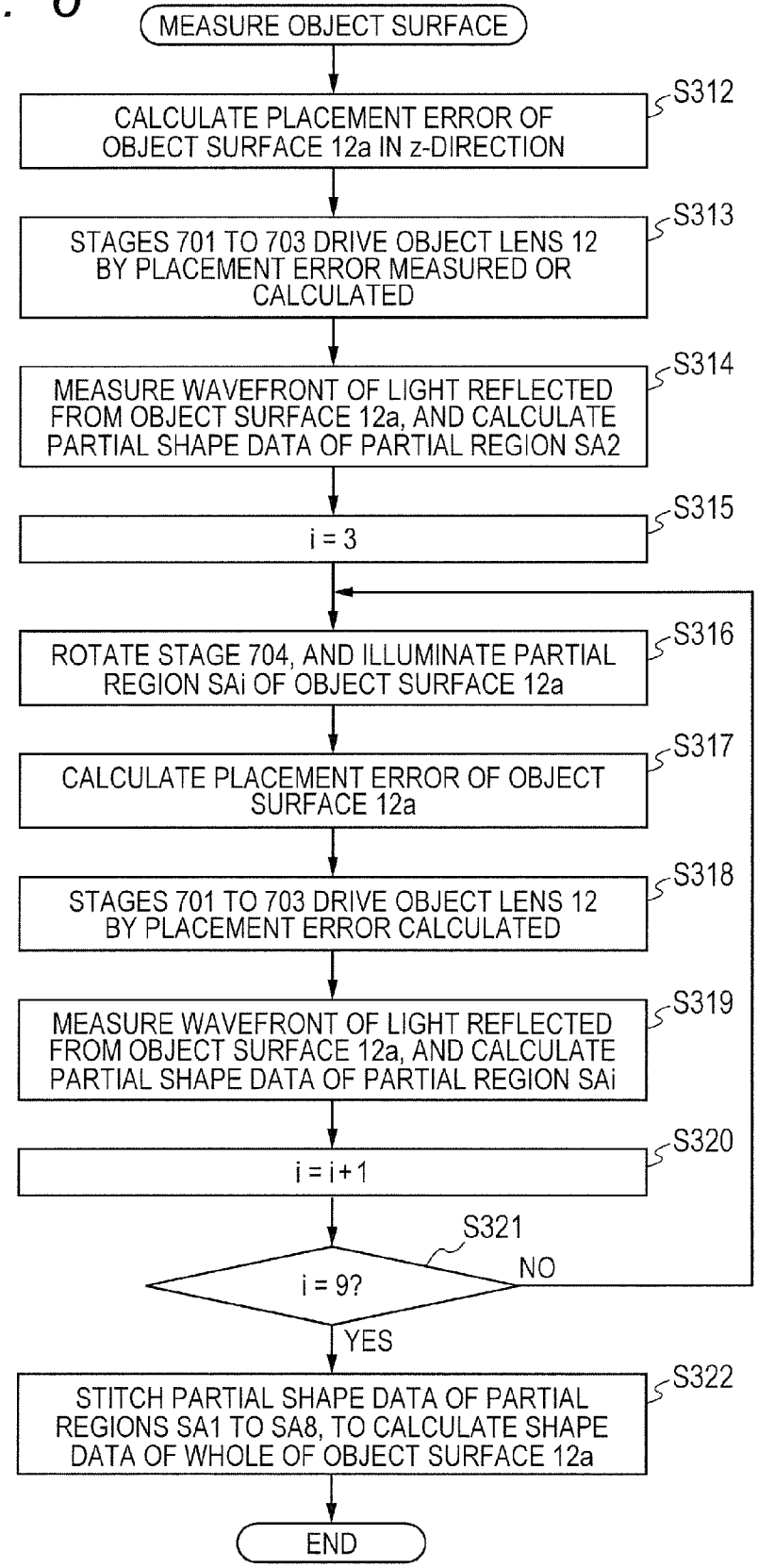
FIG. 6 is a flowchart illustrating procedures for measuring an object surface in the shape measuring method according to the first embodiment of the present invention.

FIG. 6 is a flowchart illustrating procedures for measuring the object surface in the part S333. Hereunder, measurement procedures of the first embodiment will be described in detail in step units in accordance with the flowchart in FIG. 6.

The CPU 501 calculates a placement error $\Delta z_s(\pi)$ in the z direction of the object surface 12a (S312). Placement errors of the object surface 12a after the rotary stage 704 is rotated by an angle $\theta'_z$ after the object surface 12a is placed at the design position in step S307 are taken as $\Delta x_s(\theta'_z)$, $\Delta y_s(\theta'_z)$, $\Delta z_s(\theta'_z)$, $\Delta_{x,s}(\theta'_z)$ and $\Delta \theta_{y,s}(\theta'_z)$. These are expressed in equation (7) using the axial misalignment quantities in equation (6).

$$\Delta x_s(\theta'_z) = -\sqrt{\delta_x^2 + \delta_y^2} \cos\left[\theta'_z + \mathrm{Tan}^{-1}\left(\frac{\delta_y}{\delta_x}\right)\right] + \delta_x$$

$$\Delta y_s(\theta'_z) = -\sqrt{\delta_x^2 + \delta_y^2} \sin\left[\theta'_z + \mathrm{Tan}^{-1}\left(\frac{\delta_y}{\delta_x}\right)\right] + \delta_y$$

$$\Delta \theta_{x,s}(\theta'_z) = -\sqrt{\delta_{\theta x}^2 + \delta_{\theta y}^2} \cos\left[\theta'_z + \mathrm{Tan}^{-1}\left(\frac{\delta_{\theta y}}{\delta_{\theta x}}\right)\right] + \delta_{\theta x}$$

$$\Delta \theta_{y,s}(\theta'_z) = -\sqrt{\delta_{\theta x}^2 + \delta_{\theta y}^2} \sin\left[\theta'_z + \mathrm{Tan}^{-1}\left(\frac{\delta_{\theta y}}{\delta_{\theta x}}\right)\right] + \delta_{\theta y}$$

$$\Delta z_s(\theta'_z) = \Delta x_z(\theta'_z)\tan\Theta + \sqrt{r_0^2 + z_0(r_0)^2} \left\{\sin\left[\Delta\theta_{y,s}(\theta'_z) + \Theta - \mathrm{Tan}^{-1}\left(\frac{z_0(r_0)}{r_0}\right)\right] - \sin\left[\Theta - \mathrm{Tan}^{-1}\left(\frac{z_0(r_0)}{r_0}\right)\right]\right\}$$

equation (7)

The CPU 501 calculates $\Delta z_s(\pi)$ by substituting $\theta'_z=\pi$ into equation (7).

Next, the CPU 501 drives the stages 701 to 703 to move the object lens 12 by $-\Delta x_s(\pi)$, $-\Delta y_s(\pi)$, $-\Delta z_s(\pi)$, $-\Delta\theta_{x,s}(\pi)$ and $-\Delta\theta_{y,s}(\pi)$ in the x, y, z, $\theta_x$ and $\theta_y$ directions, respectively. By this means, the object surface 12$a$ is placed at the design position (S313). That is, when the rotary stage 704 is controlled to the measurement position ($\pi$ [rad]), the CPU 501 performs alignment of the object surface 12$a$ by controlling the stages 701 to 703 to positions at which the placement errors of the object surface 12$a$ at the measurement position ($\pi$) are cancelled out (aligning).

Next, the CPU 501 calculates partial shape data $z'_{s,2}(x',y')$ of the partial region SA2 (S314: partial shape data calculating). More specifically, first, an inclination angle distribution of light rays of reflected light from the partial region SA2 of the object surface 12$a$ is detected as a wavefront by the detecting unit 9. Next, the CPU 501 traces the light rays in the opposite direction based on information regarding the imaging optical system 14, to thereby calculate the light ray angle distribution on the object surface 12$a$. In addition, the CPU 501 calculates an inclination distribution $(dz''_{s,2}(x',y')/dx', dz''_{s,2}(x',y')/dy')$ of the object surface 12$a$ in a similar manner to equation (3) based on the light ray angle distribution, and integrates the calculated inclination distribution over two dimensions. By this means, the CPU 501 calculates partial shape data $z''_{s,2}(x',y')$ for the partial region SA2. Since the systematic error of the shape measuring apparatus 100 is included in the partial shape data, the CPU 501 corrects the partial shape data with equation (8) using the data for the systematic error that is calculated in step S304, to thereby calculate corrected partial shape data $z'_{s,2}(x',y')$.

$$z'_{s,2}(x',y')=z''_{s,2}(x',y')-\Delta z'_{sys}(x',y') \quad \text{equation (8)}$$

In the first embodiment, the distribution of angles of light rays in a coordinate (x',y') of the reference surface and the object surface is acquired in the steps S304 and S309, and then the shape data in the same coordinate (x',y') is calculated. However, the distribution of angles of light rays may be acquired in the apparatus coordinate (x,y). In such case, a partial shape data of the object surface may be calculated in coordinate (x,y) tentatively, and thereafter converted into the coordinate (x',y') of the object surface.

In steps S315 to S321 thereafter, partial shape data for each of the partial regions SA3 to SA8 on the object surface 12$a$ is measured.

In this case, the partial region SA1 is illuminated at the time point at which step S307 is completed, and the object surface 12$a$ is placed at the design position. If the shape of the partial region SA1 is measured immediately thereafter, there is no necessity to rotate the rotary stage 704 again and to drive the stages 701 to 703 to suppress placement errors, and thus the procedures in this case are efficient. Therefore, immediately after step S307, corrected partial shape data $z'_{s,1}(x',y')$ for the partial region SA1 is measured by a similar procedure as in step S314. This measurement corresponds to the step S308 mentioned above. That is, while the part S332 is provided for the purpose of measuring an axial misalignment quantity between the aspheric axis 12$b$ and the rotational axis 704$a$, the part S332 also serves a purpose of acquiring partial shape data of the partial region SA1 on the object surface 12$a$ in order to realize efficient measurement.

The description will now return to the measuring in the part S333. After step S314 is completed, the CPU 501 measures corrected partial shape data $z'_{s,3}(x',y')$ to $z'_{s,8}(x',y')$ for the remaining partial regions SA3 to SA8 in accordance with the flowchart in FIG. 6.

Specifically, the CPU 501 sets a variable i that indicates a count value to "3" (S315). Next, the CPU 501 rotationally controls the rotary stage 704 to illuminate a desired partial region SAi (S316). That is, the CPU 501 controls the rotary stage 704 to a measurement position to which the rotary stage 704 is moved when detecting a wavefront of reflected light of the partial region SAi by means of the detecting unit 9.

Next, the CPU 501 calculates placement errors $\Delta x_{s,i}$, $\Delta y_{s,i}$, $\Delta z_{s,i}$, $\Delta\theta_{x,s,i}$ and $\Delta\theta_{y,s,i}$ in accordance with equation (9) (S317: estimating). That is, with respect to positions other than the two measurement positions (0, $\pi$ [rad]) among the plurality of (eight) measurement positions, the CPU 501 estimates respective placement errors with respect to the trajectory of the object surface 12$a$ by means of equation (9). The placement errors $\Delta x_{s,i}$, $\Delta y_{s,i}$ are error components in a perpendicular direction to the travelling direction of the measuring beam. The placement error $\Delta z_{s,i}$ is an error component that is parallel to the travelling direction of the measuring beam. The placement errors $\Delta\theta_{x,s,i}$ and $\Delta\theta_{y,s,i}$ are inclination error components of the aspheric axis 12$b$ of the object surface 12$a$.

$$\Delta x_{s,i}=\Delta x_s(\theta'_{z,i})-\Delta x_s(\theta'_{z,i-1})$$

$$\Delta y_{s,i}=\Delta y_s(\theta'_{z,i})-\Delta y_s(\theta'_{z,i-1})$$

$$\Delta z_{s,i}=\Delta z_s(\theta'_{z,i})-\Delta z_s(\theta'_{z,i-1})$$

$$\Delta\theta_{x,s,i}=\Delta\theta_{x,s}(\theta'_{z,i})-\Delta\theta_{y,s}(\theta'_{z,i-1})$$

$$\Delta\theta_{y,s,i}=\Delta\theta_{y,s}(\theta'_{z,i})-\Delta\theta_{y,s}(\theta'_{z,i-1}) \quad \text{equation (9)}$$

Here, i=3, 4, 5, 6, 7, 8, $\theta'_{z,2}=\pi$, $\theta'_{z,3}=5\pi/4$, $\theta'_{z,4}=3\pi/2$, $\theta'_{z,5}=7\pi/4$, $\theta'_{z,6}=\pi/4$, $\theta'_{z,7}=\pi/2$ and $\theta'_{z,8}=3\pi/4$. Further, $\Delta x_s$, $\Delta y_s$, $\Delta z_s$, $\Delta\theta_{x,s}$ and $\Delta\theta_{y,s}$ are determined with equation (7).

The CPU 501 drives the stages 701 to 703 to move the object lens 12 by the amounts of $-\Delta x_{s,i}$, $-\Delta y_{s,i}$, $-\Delta z_{s,i}$, $-\Delta\theta_{x,s,i}$ and $-\Delta\theta_{y,s,i}$ in the x, y, z, $\theta_x$, and $\theta_y$ directions, respectively, to thereby place the object surface 12$a$ in the design position (S318). That is, when the rotary stage 704 is controlled to a measurement position, the CPU 501 performs alignment of the object surface 12$a$ by controlling the stages 701 to 703 to positions at which the placement errors of the object surface 12$a$ at the measurement position are cancelled out (aligning).

By a similar procedure as in step S314, the CPU 501 calculates corrected partial shape data $z'_{s,i}(x',y')$ for each of the partial regions of the object surface 12$a$ (S319: partial shape data calculating).

Next, the CPU 501 increments the variable i by 1 (S320), and determines whether or not the variable i has reached 9 (3321). If the result of the determination is that the variable i has not reached 9, the CPU 501 returns to the processing in step S316, while if the result of the determination is that the variable i has reached 9, the CPU 501 transitions to the processing in step S322. That is, the CPU 501 repeats the processing in these steps S316 to S319 in cases where i=3 to 8.

Note that, step S317 may be performed before step 3316, and step S316 and step S318 may be performed simultaneously. When these procedures are adopted, the measurement can be shortened by an amount of time corresponding to the amount of time required for step S318.

Next, by stitching the obtained partial shape data $z'_{s,i}(x',y')$, the CPU 501 acquires shape data $z'_s(x',y')$ for the object surface 12$a$ over the whole surface thereof (S322). When stitching the obtained partial shape data $z'_{s,i}(x',y')$, the partial shape data can be stitched with high accuracy by using a known method that is described, for example, in Japanese Patent Application Laid-Open No. 2013-160680. Thus, the part S333 is completed, and the entire measuring is also completed.

According to the first embodiment, when measuring the respective shapes of the plurality of (eight) partial regions SA1 to SA8 on the object surface 12a, the CPU 501 moves the rotary stage 704 to a plurality of (eight) measurement positions along the drive direction (rotational direction). That is, the CPU 501 controls the rotary stage 704 to the eight measurement positions 0, π/4, π/2, 3π/4, π, 5π/4, 3π/2 and 7π/4 [rad] around the rotational axis 704a.

Further, in step S305 the CPU 501 controls the rotary stage 704 to a measurement position (first position: 0 [rad]) corresponding to the partial region SA1. Also, in step S309, the CPU 501 controls the rotary stage 704 to a measurement position (second position: π [rad]) corresponding to the partial region SA2. That is, the CPU 501 measures placement errors of the object surface 12a by controlling the rotary stage 704 to two measurement positions as at least two positions among the plurality (eight) measurement positions.

That is, in steps S305 and S309, the CPU 501 controls the stage 704 to two measurement positions (first position and second position) among the plurality of (eight) measurement positions to move the object surface 12a (moving). The second position is a position to which the rotary stage 704 is rotated π [rad] in the rotational direction around the rotational axis 704a thereof relative to the first position.

Further, in steps S306 and S310 the CPU 501 actually measures the placement errors at each of the two measurement positions based on wavefronts detected by the detecting unit 9 in states in which the rotary stage 704 is moved to each of the two measurement positions.

Further, based on the placement errors that are actually measured in steps S306 and S310, in steps S311 and S317 the CPU 501 estimates placement errors at the six measurement positions other than the two measurement positions corresponding to the partial regions SA1 and SA2 among the plurality of partial regions SA1 to SA8. That is, the CPU 501 uses equation (9) to estimate placement errors at measurement positions corresponding to the partial regions SA3 to SA8. In particular, in step S311, based on the placement errors that are actually measured at the two measurement positions (0, π [rad]), the CPU 501 determines axial misalignment quantities of the aspheric axis 12b of the object surface 12a with respect to the rotational axis 704a of the rotary stage 704. Further, in step S317, based on the axial misalignment quantities (that is, using equation (9)), the CPU 501 determines respective placement errors with respect to the trajectory at the six measurement positions.

Further, before each detection when detecting the respective wavefronts of reflected light at each of the partial regions SA1 to SA8 by means of the detecting unit 9 for calculating the partial shape data, in steps S305, S309 and S316 the CPU 501 controls the stage 704 to each measurement position. In addition, in steps S307, S313 and S318 the CPU 501 controls the stages 701 to 703 to positions that cancel out placement errors at the respective measurement positions to thereby align the object surface 12a (aligning).

Thus, according to the first embodiment, misalignments (placement errors) from a predetermined trajectory that arise when the object surface 12a is driven with the rotary stage 704 are estimated, and the object surface 12a is driven with the stages 701 to 703 so as to cancel out the misalignments to thereby align the object surface 12a. Therefore, while maintaining the alignment accuracy, the number of times that placement errors are measured for alignment can be reduced and the time required for alignment can also be decreased.

Further, in the first embodiment, the rotary stage 704 is controlled to two measurement positions when measuring the partial shape of the partial regions SA1 and SA2, and placement errors of the object surface 12a are actually measured. That is, according to the first embodiment, the positions of the rotary stage 704 at which actual measurement is performed for estimating placement errors of the object surface 12a at the respective measurement positions are the two measurement positions at a time of measuring the partial shape of the partial regions SA1 and SA2.

Thus, in the first embodiment, acquisition of actual measurement data for estimating placement errors of the object surface 12a at each measurement position also serves as actual measurement of placement errors at the two measurement positions when measuring the partial shapes of the partial regions SA1 and SA2. By this means, it is not necessary to estimate placement errors at the two measurement positions for performing shape measurement of the partial regions SA1 and SA2, and hence the time required for alignment can be further reduced.

(Other Example Regarding Systematic Error Correction Method)

In the first embodiment, $\Delta z'_{sys}(x',y')$ is calculated as systematic error data in step S304, and partial shape data is corrected in accordance with equation (4) in steps S308, S314 and S319. However, the correction method is not limited thereto.

For example, a method may be adopted in which, in step S304, the calculation is performed only for inclination distribution data $(dz''_b(x',y')/dx', dz''_b(x',y')/dy')$ of the reference surface. On the other hand, in steps S308, S314 and S319, after calculating the inclination distribution $(dz''_{s,i}(x', y')/dx', dz''_{s,i}(x',y')/dy')$ of the object surface in each partial region SAi, the inclination distribution of a shape difference $\Delta z'_i$ between the object surface and the reference surface is determined by equation (10).

$$\frac{d\Delta z'_i(x', y')}{dx'} = \frac{dz''_{s,i}(x', y')}{dx'} - \frac{dz''_b(x', y')}{dx'}$$

$$\frac{d\Delta z'_i(x', y')}{dy'} = \frac{dz''_{s,i}(x', y')}{dy'} - \frac{dz''_b(x', y')}{dy'}$$

equation (10)

Where, i=1 to 8. Thereafter, the CPU 501 integrates $(d\Delta z'_i(x',y')/dx', d\Delta z'_i(x',y')/dy')$ over two dimensions to acquire a shape difference $\Delta z'_i(x',y')$ between the object surface and the reference surface. The CPU 501 calculates shape data $z'_{s,i}(x',y')$ in which each partial region of the object surface is corrected by equation (11).

$$z'_{s,i}(x',y') = \Delta z'_i(x',y') + z'_b(x',y')$$

equation (11)

According to this method, a systematic error is not directly calculated. However, a systematic error is included in the inclination distribution data $(dz''_b/dx', dz''_b/dy')$ of the reference surface, and the systematic error included in the inclination distribution data $(dz''_{s,i}/dx', dz''_{s,i}/dy')$ of the object surface is corrected by equation (10) (11) using the inclination distribution data $(dz'_b/dx', dz'_b/dy')$ of the reference surface. That is, according to this method, the inclination distribution data $(dz''_b/dx', dz''_b/dy')$ of the reference surface corresponds to systematic error data, and a systematic error included in the object surface data is corrected using the inclination distribution data ($dz'_b/dx'$, $dz'_b/dy'$) of the reference surface.

Further, in the first embodiment, shape data $z'_b$ for the reference surface 11a is acquired in advance with another measurement apparatus, and a systematic error of the present apparatus is corrected using the shape data $z_b$ acquired with the other measurement apparatus. However, if a reference surface 11a is used for which a difference with respect to the design shape $z'_0$ is sufficiently small, a configuration may also be adopted in which a systematic error is corrected using $z'_0$. In that case, equation (4) and equation (11) are applied after substituting $z'_b=z'_0$ into these equations.

Example

A test was conducted according to the first embodiment. A case where step S313 and step S318 in the flowcharts from FIG. 3 to FIG. 6 were not executed, that is, a case where alignment of the object surface was not performed other than prior to measurement of the partial region SA1 was adopted as a comparative example. In the comparative example, placement errors of approximately 300 [μm] in the xy directions, approximately 20 [μm] in the z direction, and approximately 0.05 [°] in the $\theta_x$ and $\theta_y$ directions arose. In contrast, in the example in which step S313 and step S318 were performed, placement errors were suppressed to 6 [μm] in the xy directions, 2 [μm] in the z direction and 0.001 [°] in the $\theta_x$ and $\theta_y$ directions.

Further, the time required to acquire the shape of the whole object surface was shortened by an amount corresponding to a time required for measurement of the placement errors. Based on the result of this test it was verified that, by implementing the first embodiment, a time required for lens position measurement for alignment can be reduced while maintaining the alignment accuracy.

Note that, although in the first embodiment a case is described in which placement errors are actually measured at two measurement positions (θ, π [rad]) among a plurality of (eight) measurement positions (0 to 7π/4 [rad]) along the rotational direction, the present invention is not limited thereto. A configuration may also be adopted in which the positions at which placement errors of the object surface 12a are actually measured are any positions among 0 to 2π [rad] along the rotational axis 704a. At this time, actual measurement data of placement errors at least at two positions is necessary in order to estimate placement errors of the object surface 12a at measurement positions of the rotary stage 704. Further, it is sufficient that the number of actual measurements is less than the number (8) of measurement positions. In addition, in a case where a position of the rotary stage 704 at which a placement error is actually measured is a measurement position, it is not necessary to estimate a placement error at that actually measured position.

Second Embodiment

In the first embodiment, the placement error of the object surface 12a is estimate based on the misalignment between the aspheric axis 12b of the object surface and the rotational axis 704a of the rotary stage, and the stages 701 to 703 are driven to cancel the placement error. The first embodiment is based on the premise that the rotary stage 704 rotates along a trajectory around the rotational axis 704a. However, actually, the rotary stage 704 rotates, with a finite error (a driving error of the rotary stage 704), along a trajectory around the rotational axis 704a. When the driving error is larger than a placement accuracy tolerable for the object surface, the alignment of the object surface in sufficient accuracy can't be achieved only this procedures.

Figure 7:
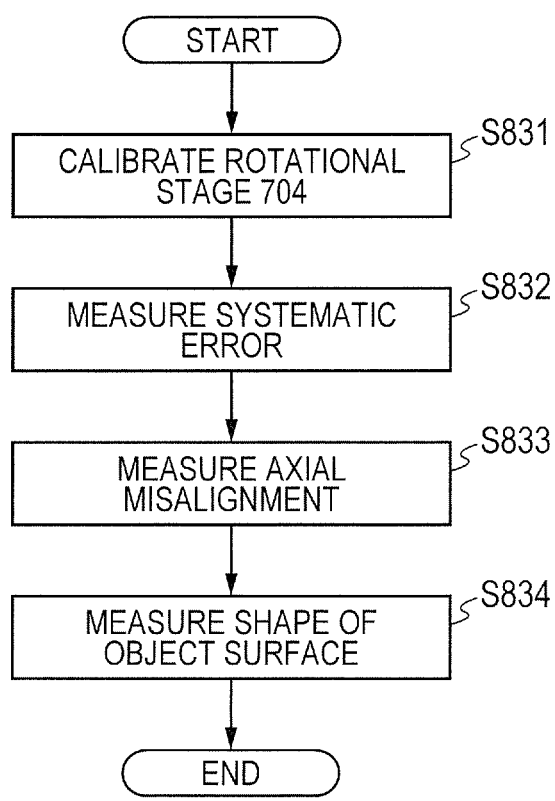
FIG. 7 is a flowchart illustrating a shape measuring method according to a second embodiment of the present invention.

Accordingly, in the second embodiment, the driving error of the rotary stage 704 is preliminary calibrated. And, before acquiring each of the partial shape data of the object surface, the stages 701 to 703 are driven to cancel the driving error. FIG. 7 is a flowchart illustrating a procedures of the shape measuring according to the second embodiment of the present invention. A step S831 for calibrating the driving error of the rotary stage 704 is included in addition to the steps in the first embodiment. A step S832 for measuring a systematic error and a step S833 for measuring the axial misalignment are executed respectively similar to the steps S331 and 3332 in the first embodiment. A step S834 for measuring the shape of the object surface includes a step of driving the stages 701 to 703 to cancel the driving error of the rotary stage 704, in addition to the step S333 in the first embodiment. The shape measuring apparatus of the second embodiment has a structure similar to the shape measuring apparatus 100 of the first embodiment.

When the driving error of the rotary stage 704 is to be calibrated in the step S831, a reference lens 11 being a reference object is mounted as a guidepost on the rotary stage 704. And, the placement error (a position of the guidepost) of the reference surface 11a is calculated rotating the rotary stage 704, to calculate a relation between the rotation angle and the driving error as the driving error data. Therein, since the placement error due to the misalignment between the aspheric axis 11b on the reference surface 11a and the rotational axis 704a of the rotary stage 704 is not due to the driving error of the rotary stage 704, the placement error should not be included in driving error data. Accordingly, in the step S831, steps (following steps S802 to S805) for preliminary calculating such axial misalignment and steps (following steps S807 and S808) for driving the stages 701 to 703 to cancel the placement error due to the axial misalignment are executed.

Figure 8:
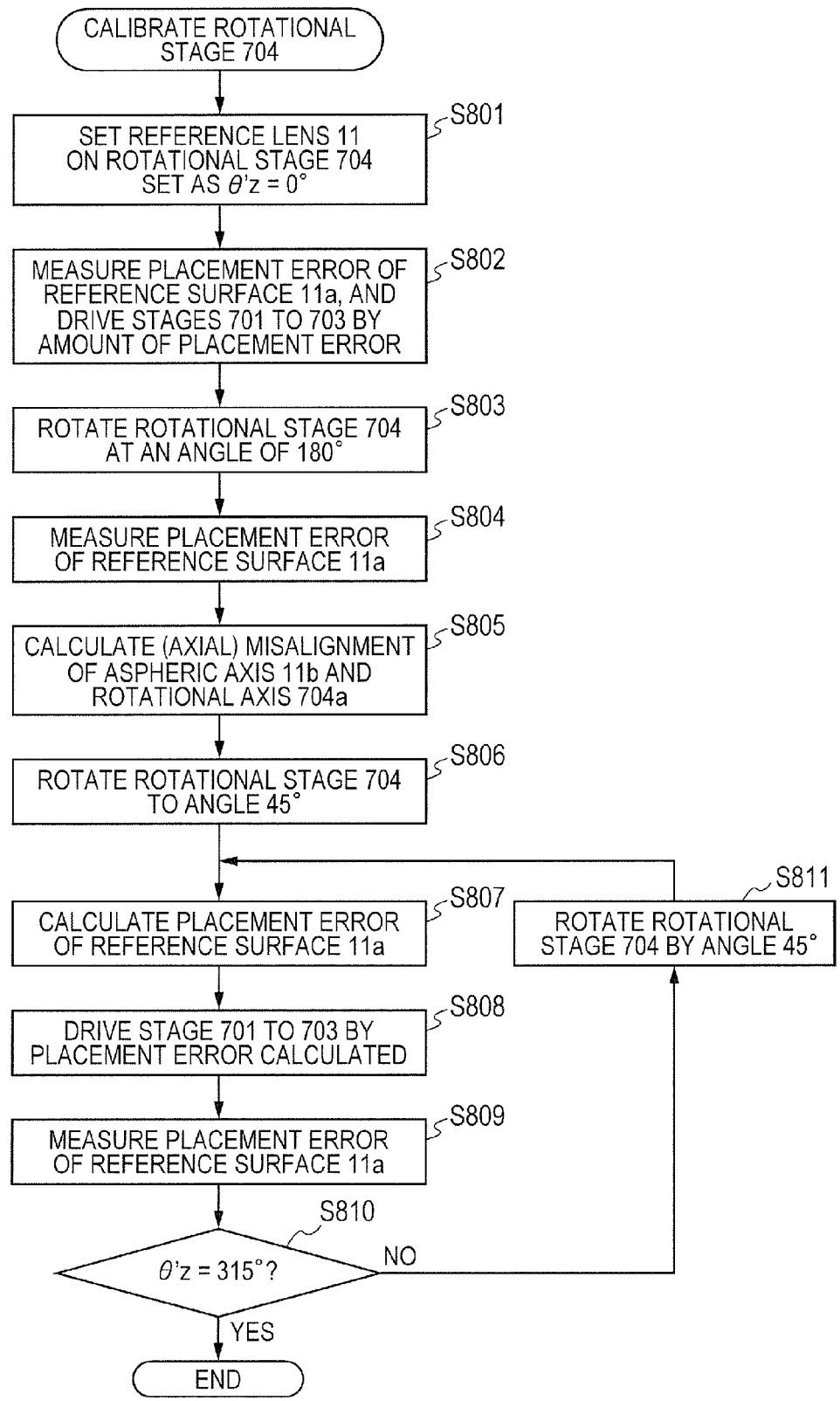
FIG. 8 is a flowchart illustrating procedures for calibrating a rotational stage in the shape measuring method according to the second embodiment of the present invention.

FIG. 8 is a flowchart illustrating a details of the step S831 for calibrating the rotational stage 704 in the shape measuring method according to the second embodiment of the present invention.

Firstly, the rotational stage 704 is at an angle $\theta'_z=0°$. And, the reference lens 11 is mounted on the holding base 705 (step S801). "A design position" which is in an ideal placement is in a state such that the aspheric axis 11b of the reference surface 11a is aligned with the measuring beam axis 13, and the conjugate plane of the detecting unit 9 is aligned with a position of the reference surface 11a on the measuring beam axis 13. The stages 701 to 703 are driven to place the reference surface 11a approximately onto the design position.

However, at that time, the reference surface 11a is merely placed on the design position in machine accuracy. Then, similar to the steps S302 and S303 in the first embodiment, the CPU 501 calculates the placement error of the reference surface 11a in relation to the design position, to drive the stages 701 to 703 by the placement error (step S802). Thereby, the placement error of the reference surface 11a is suppressed.

Thereafter, the CPU 501 rotates the rotational stage 704 by an angle of 180° (step S803), to measure (step S804) the placement error of the reference surface 11a in a similar procedures as in step S302 in the first embodiment. Further, the CPU 501 calculates a quantity of the misalignment between the aspheric axis 11b and the rotational axis 704a of the rotary stage 704, according to the equation (6) (step S805).

Next, the CPU 501 rotates the rotational stage 704 by an angle $\theta'_z=45°$ (step S806), calculates the placement error based on the axial misalignment according to the equation (7) (step S807), and drives the stages 701 to 703 for cancelling the misalignment (step S808). And then, the CPU 501 calculates a still remaining placement error of the reference surface 11a, as a driving error data of the rotary stage 704 (step S809), in a similar manner as the step S302 in the first embodiment. That is, a wavefront of a light reflected from the reference surface 11a is measured by a detecting unit 9, to calculate a position of the reference lens 11. Thereafter, the CPU 501 determines as to whether the angle $\theta'_z$ reach 315° or not (step S810). When the angle $\theta'_z$ does not reach 315° (step S810: No), the CPU 501 rotates the rotary stage 704 by 45° (step S811) until the angle $\theta'_z$ reaches 315° (step S810: Yes). The steps S807 to S809 are repeated. Thereby, the CPU 501 acquires driving data of the rotational stage 704 at an interval of 45° over 0° to 315° (driving error measuring step).

In the second embodiment, the driving error data is acquired at an angular interval (=45°), same as the partial region. However, in order to achieve the calibration in higher accuracy, a smoothing by acquiring the driving error data at an interval of smaller angle may be performed.

Figure 9:
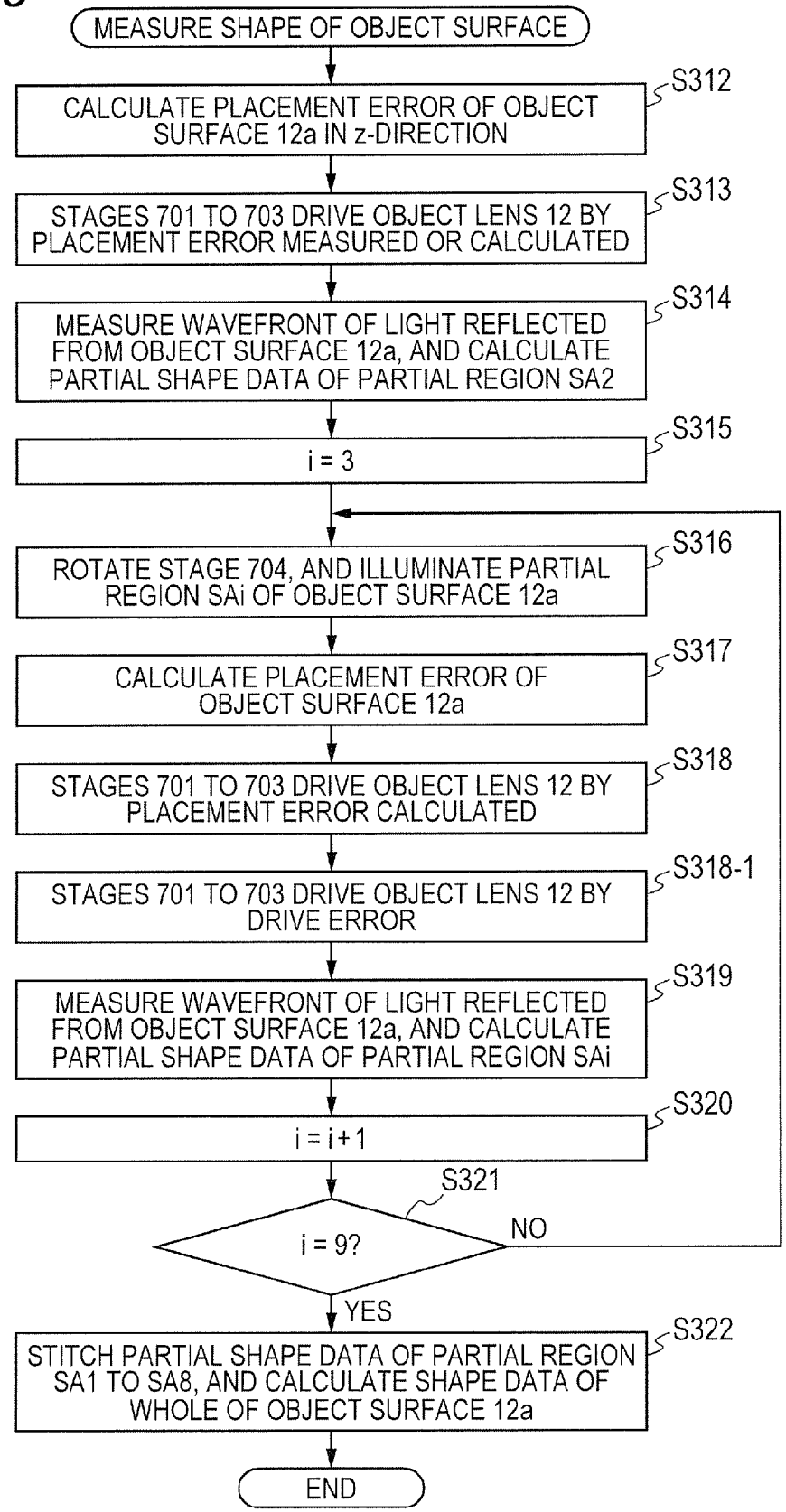
FIG. 9 is a flowchart illustrating procedures for measuring an object surface in the shape measuring method according to the second embodiment of the present invention.

A step S834 for measuring the shape of the object surface is executed in similar procedures as in the step S333 in the first embodiment. FIG. 9 is a flowchart illustrating procedures for measuring a shape of an object surface in the shape measuring method according to the second embodiment of the present invention. In the shape measuring method according to the second embodiment shown in FIG. 9, a driving error measuring step is added to the shape measuring method according to the first embodiment shown in FIG. 6. And, in FIG. 9, the same steps as in the steps in FIG. 6 are denoted by the same reference signs. The CPU 501 drives the stages 701 to 703 carrying the object lenses (S318-1: driving error correction step) at an extent of the driving error data acquired in the steps S831 to cancel the driving error of the rotational stage 704, just before the step S319. The second embodiment is different from the first embodiment in an addition of the step S318-1. And, in order to reduce the measuring time, the step S318-1 may be executed simultaneously with the step S316 or the step S318.

And, in the second embodiment, at the time of calibrating the rotational stage 704 in the step S831, as the guidepost, the reference lens 11 which is a reference object is used similar to the measuring the systematic error. However, the other object may be used so long as it has an optical surface as the guidepost. A designed shape of the guidepost may be the same as or different from that of the object surface 12a and the reference surface 11a. And, if it is guaranteed that the shape of the object surface 12a is not deviated substantially from the designed shape, the object surface 12a may be used.

Moreover, it is unnecessary to execute the step S831 for calibrating the rotational stage 704, at every time of the measuring the shape of the object lens. The step S831 may be execute at least once after assembling the shape measuring apparatus 100.

As described in the above, in the second embodiment, the driving error of the rotational stage 704 is acquired preliminary. The object lens is driven by the stages 701 to 703 at an extent of the driving error. In comparison with the first embodiment, the placement error of the object surface 12a can be effectively reduced.

Third Embodiment

According to the third embodiment, similar to the second embodiment, the shape measuring apparatus 100 shown in FIG. 1 is used. And, measuring the shape is performed according to a flowchart shown in FIG. 7. However, detailed procedures of the step S831 for calibrating the rotational stage 704 is different from that of the second embodiment. According to the second embodiment, in order to acquire the driving error data of the rotational stage 704, the placement error of the reference surface 11a is measured while rotating the reference lens 11 by the rotational stage 704. At that time, in order to suppress the placement error due to the axial misalignment, the stages 701 to 703 are driven to cancel the placement error due to the axial misalignment. According to the third embodiment, similar to the second embodiment, the reference lens 11 is rotated by the rotational stage 704, while the placement error of the reference surface 11a is measured. However, at that time, the stages 701 to 703 are not driven. Therein, fitting of the placement error data acquired is performed, to acquire the driving error data without containing the placement error due to the axial misalignment.

Figure 10:
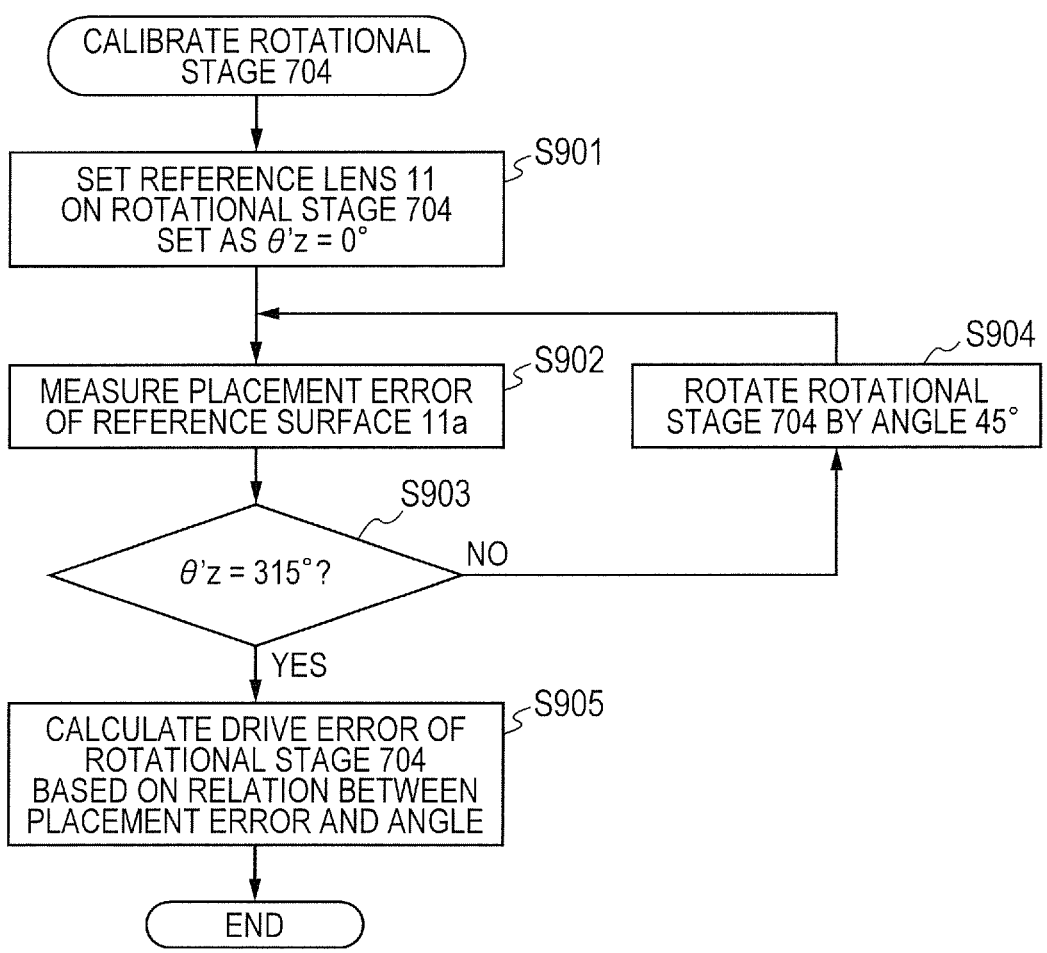
FIG. 10 is a flowchart illustrating procedures for calibrating a rotational stage in a shape measuring method according to a third embodiment of the present invention.

FIG. 10 is a flowchart illustrating detailed procedures of a step S831 for calibrating a rotational stage in a shape measuring method according to a third embodiment of the present invention. Firstly, similar to the step S801 according to the second embodiment, the rotational stage 704 is set at an angle $\theta'_z=0°$, and the reference lens 11 is mounted on the holding base 705 (step S901). Next, the CPU 501 measures placement errors, $\Delta x_b(\theta'_z)$, $\Delta y_b(\theta'_z)$, $\Delta z_b(\theta'_z)$, $\Delta\theta_{x,b}(\theta'_z)$, $\Delta\theta_{y,b}(\theta'_z)$ of the reference surfaces 11a (step S902). The CPU 501 determines as to whether $\theta'_z$ reaches 315° or not (step S903). When the $\theta'_z$ does not reach 315° (step S903: No), the CPU 501 rotates the rotational stage 704 at an angle 45° (step S904), and returns to the step S902. Thus, the CPU 501 repeats the measuring the placement error in the step S902 and the rotation of the rotational stage 704 at the angle 45° (step S904), until the $\theta'_z$ reaches 315° (step S903: Yes). Thereafter, the CPU 501 extracts from the acquired (step S905) placement error data the driving error data $\Delta x_{st}(\theta'_z)$, $\Delta y_{st}(\theta'_z)$, $\Delta z_{st}(\theta'_z)$, $\Delta\theta_{x,st}(\theta'_z)$, $\Delta\theta_{y,st}(\theta'_z)$ of the rotational stage 704. In concrete, firstly, the placement error data is subjected to the fitting according to an equation (12), to acquire parameters $r_1$, $r_2$, $\theta_1$, $\theta_2$, $x_1$, $x_2$, $y_1$, $y_2$, as follow.

$$\Delta x_b(\theta'_z) = r_1 \cos(\theta'_z - \theta_1) + x_1$$

$$\Delta y_b(\theta'_z) = r_1 \sin(\theta'_z - \theta_1) + y_1$$

$$\Delta\theta_{x,b}(\theta'_z) = r_2 \cos(\theta'_z - \theta_2) + x_2$$

$$\Delta\theta_{y,b}(\theta'_z) = r_2 \sin(\theta'_z - \theta_2) + y_2 \qquad \text{equation (12)}$$

Thereafter, according to a following equation (13), the driving error data $\Delta x_{st}$, $\Delta y_{st}$, $\Delta z_{st}$, $\Delta\theta_{x,st}$, $\Delta\theta_{y,st}$ of the rotational stage 704 is calculated.

$$\Delta x_{st}(\theta'_z) = \Delta x_b(\theta'_z) - r_1 \cos(\theta'_z - \theta_1) - x_1$$

$$\Delta y_{st}(\theta'_z) = \Delta y_b(\theta'_z) - r_1 \sin(\theta'_z - \theta_1) - y_1$$

$$\Delta z_{st}(\theta'_z) = \Delta z_b(\theta'_z)$$

$$\Delta\theta_{x,st}(\theta'_z) = \Delta\theta_{x,b}(\theta'_z) - r_2 \cos(\theta'_z - \theta_2) - x_2$$

$$\Delta\theta_{y,st}(\theta'_z) = \Delta\theta_{y,b}(\theta'_z) - r_2 \sin(\theta'_z - \theta_2) - y_2 \qquad \text{equation (13)}$$

In a step S834, similar to the second embodiment, the object lens is driven by the stages 701 to 703 by an extent of the driving error data acquired, to cancel the driving error of the rotational stage 704.

In the third embodiment, since the step of measuring the quantity of the axial misalignment, and the step of driving the stages 701 to 703 by an extent of the placement error due to the axial misalignment are included, the measurement time can be reduced rather than that of the second embodiment.

Fourth Embodiment

According to the fourth embodiment, similar to the second embodiment and the third embodiment, the shape measuring apparatus 100 shown in FIG. 1 is used, and the shape measuring is performed according to the flowchart shown in FIG. 7. However, a details of the step S831 for calibrating the rotational stage 704 is different from those in the second embodiment and the third embodiment. According to the second embodiment and the third embodiment, the rotational stage 704 is rotated, while the position of the reference lens 11 which is the reference object is measured as the guide post in a non-contact manner, to calculate the driving error of the rotational stage 704. According to the fourth embodiment, the guide post is measured by a contact type prove.

As the contact type prove, for example, a dial gauge may be used. In this case, as the guidepost, the lens may be used similar to the second embodiment and the third embodiment. A cylindrical pin made from a metal would be more desirable. As a procedures, upper and lower ends of the pin is contacted to the dial gauge, while rotating the rotational stage, to acquire a relation between a rotational angle and an out put from the dial gauge. This data contains, in addition to the driving error of the rotational stage, an operation of the pin due to a misalignment between the rotational axis 704a of the rotational stage and an axis of the pin. This data is subjected to the step S904. As a result, the driving error data of the rotational stage 704 can be acquired.

In the step S834, similar to the second embodiment and the third embodiment, the object lens is driven by the stages 701 to 703 by an extent of the driving error acquired, to cancel the driving error of the rotational stage 704.

According to the fourth embodiment, the driving error of the rotational stage 704 is acquired preliminary, to drive the object lens to cancel the driving error. Accordingly, the placement error of the object surface can be effectively reduced rather than the first embodiment.

Fifth Embodiment

In the first to fourth embodiments, placement errors of the object surface 12a after rotation are estimated based on a misalignment between the aspheric axis 12b of the object surface and the rotational axis 704a of the rotary stage, and the stages 701 to 703 are driven to cancel out the estimated placement errors. According to the second to fourth embodiments, the driving error of the rotational stage is acquired preliminary, to drive the stages 701 to 703, and to cancel the error. However, if the placement accuracy required for the object surface is high and the driving accuracy of the stages 701 to 703 is insufficient, the object surface cannot be aligned with sufficient accuracy by performing only the aforementioned procedures.

Therefore, in the fifth embodiment, after performing the alignment described in the first embodiment, placement error measurement and object surface driving are repeated, and placement errors of the object surface are suppressed to the necessary accuracy.

Figure 11:
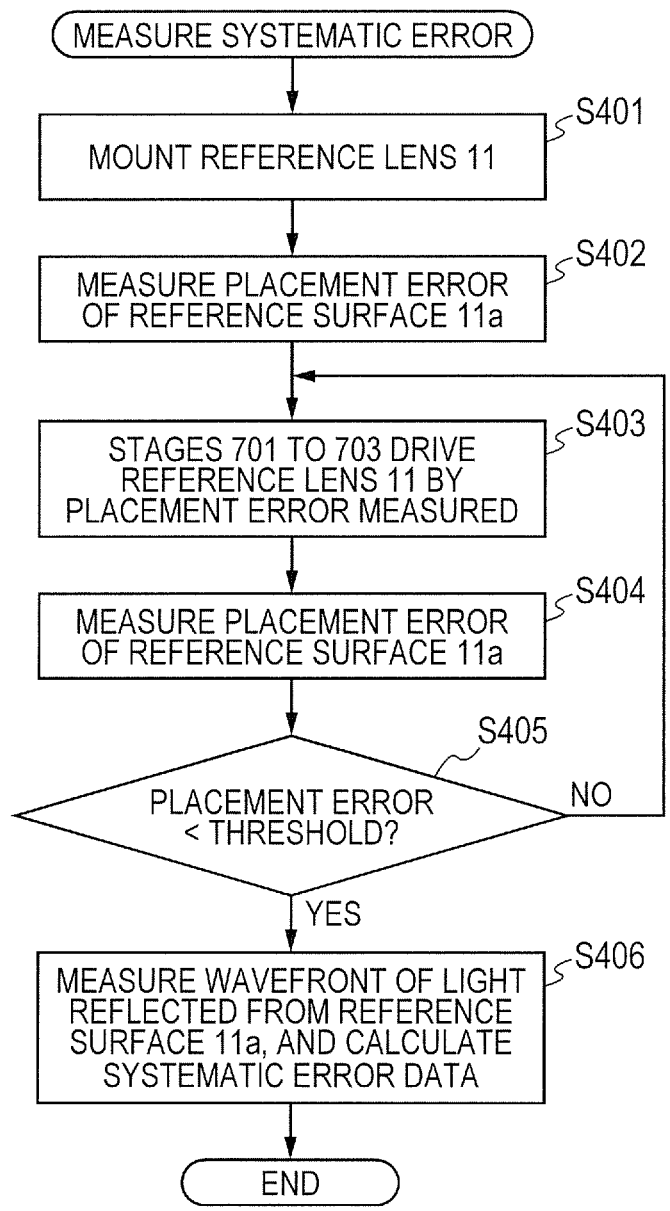
FIG. 11 is a flowchart illustrating procedures for measuring a systematic error in a shape measuring method according to a fifth embodiment of the present invention.
Figure 12:
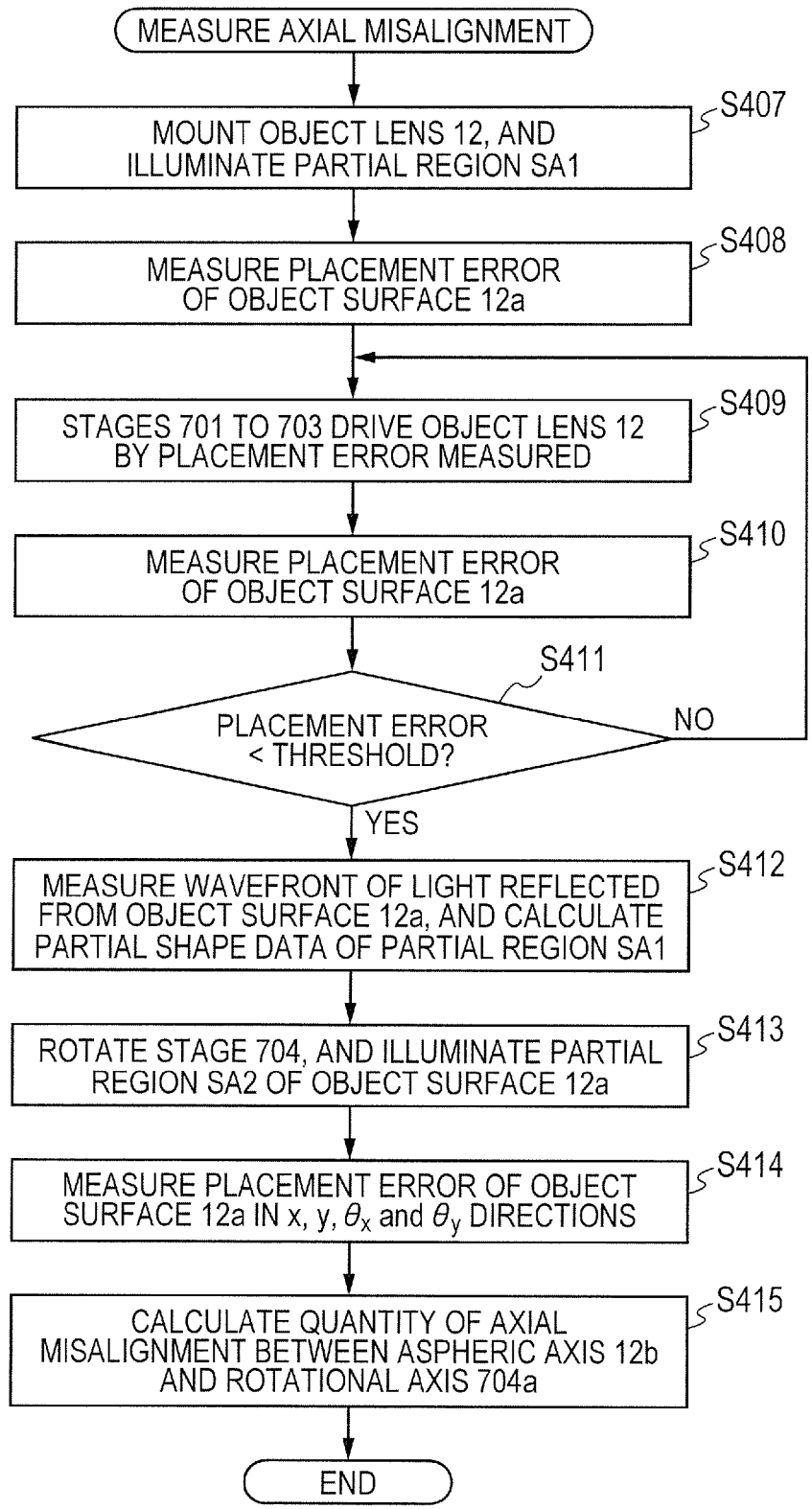
FIG. 12 is a flowchart illustrating procedures for measuring an axial misalignment in the shape measuring method according to the fifth embodiment of the present invention.
Figure 13:
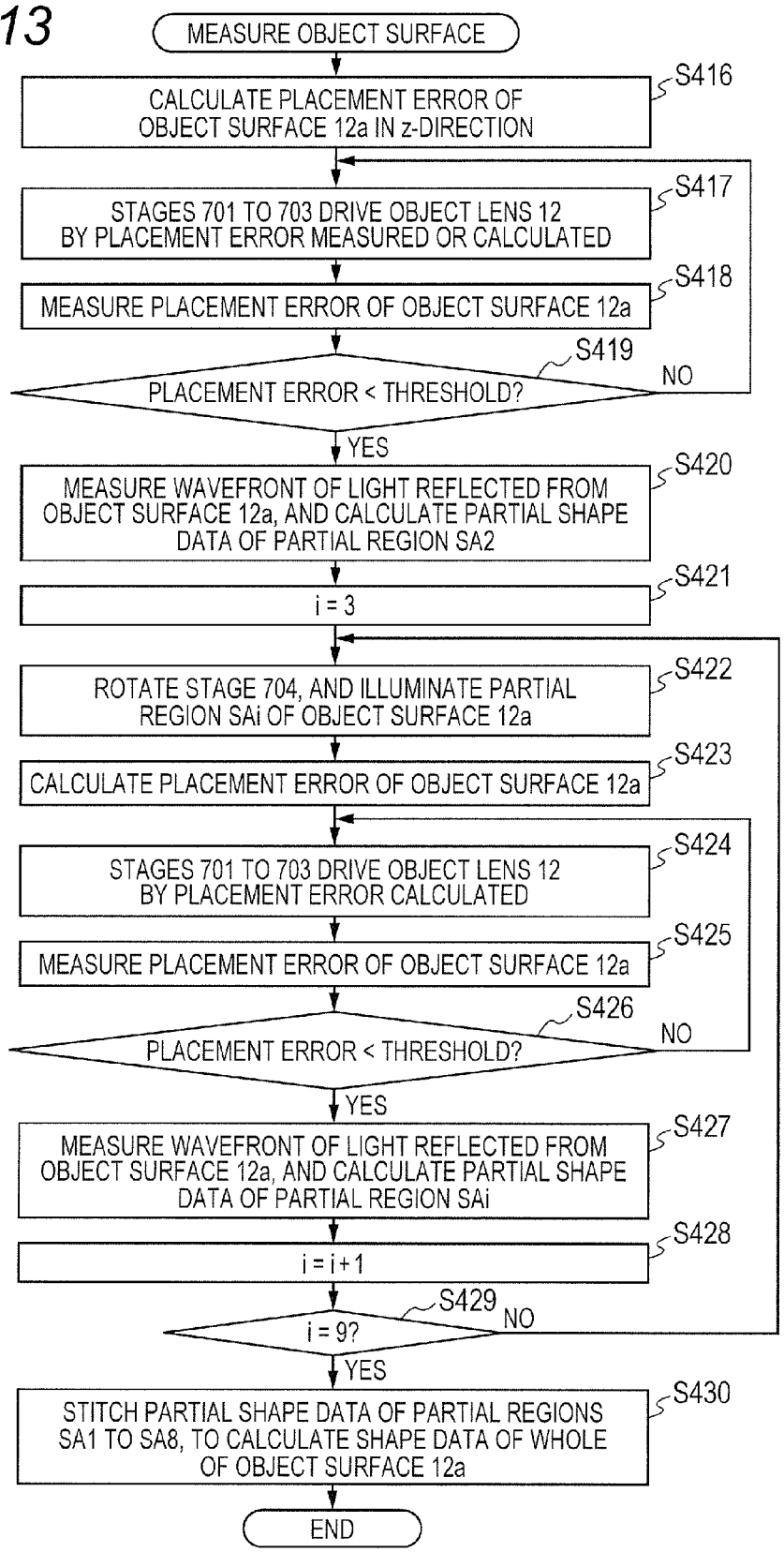
FIG. 13 is a flowchart illustrating procedures for measuring an object surface in the shape measuring method according to the fifth embodiment of the present invention.

FIG. 11 is a flowchart illustrating procedures for measuring a systematic error in the shape measuring method according to the second embodiment of the present invention. FIG. 12 is a flowchart illustrating procedures for measuring an axial misalignment in the shape measuring method according to the second embodiment of the present invention. FIG. 13 is a flowchart illustrating procedures for measuring an object surface in the shape measuring method according to the fifth embodiment of the present invention. Note that, the configuration of the shape measuring apparatus of the fifth embodiment is the same as the configuration of the shape measuring apparatus 100 in the above described first embodiment.

In steps S401 to S403 and step 3406 in FIG. 11, similar processing as in steps S301 to S304 in FIG. 4 is performed. In the fifth embodiment, steps S404 and 3405 are added. After the reference surface 11a is aligned in step S403, in step S404 the CPU 501 again measures (actual measurement) a placement error of the reference surface 11a. Further, in step S405 the CPU 501 determines whether or not the placement error measured in step 3404 is less than a threshold. That is, the CPU 501 repeatedly performs control of the stages 701 to 703 to move the reference surface 11a to a position that cancels out a placement error of the reference surface 11a until determining that the placement error of the reference surface 11a that is determined based on a wavefront detected by the detecting unit 9 is less than a previously set threshold.

In addition, in steps S407 to S409 and steps S412 to S415 in FIG. 12, similar processing as in steps S305 to S311 in FIG. 5 is performed. Further, in steps S416, S417, S420 to S424 and S427 to S430 in FIG. 13, similar processing as in steps S312 to S322 in FIG. 6 is performed. In the fifth embodiment, steps S410, S411, S418, S419, S425 and S426 are added.

That is, after aligning the object surface 12a in step S409 in order to measure the shape of the partial region SA1, in step S410 the CPU 501 again measures (actually measures) a placement error of the object surface 12a. Subsequently, in step S411, the CPU 501 determines whether or not the placement error measured in step S410 is less than a threshold. That is, the CPU 501 repeatedly performs control of the stages 701 to 703 to move the object surface 12a to a position that cancels out the placement error of the object surface 12a until determining that the placement error of the object surface 12a that is determined based on a wavefront detected by the detecting unit 9 is less than a previously set threshold.

Similarly, after aligning the object surface 12a in step S417 in order to measure the shape of the partial region SA2, in step S418 the CPU 501 again measures (actually measures) a placement error of the object surface 12a. Subsequently, in step S419, the CPU 501 determines whether or not the placement error measured in step S418 is less than a threshold. That is, the CPU 501 repeatedly performs control of the stages 701 to 703 to move the object surface 12a so as to cancel out the placement error of the object surface 12a until the CPU 501 determines that the placement error of the object surface 12a that is determined based on a wavefront detected by the detecting unit 9 is less than a previously set threshold.

In addition, after aligning the object surface 12a in step S424 in order to measure the shape of the partial region SAi, in step S425 the CPU 501 again measures (actually measures) a placement error of the object surface 12a. Subsequently, in step S426, the CPU 501 determines whether or not the placement error measured in step S425 is less than a threshold. That is, the CPU 501 repeatedly performs control of the stages 701 to 703 to move the object surface 12a so as to cancel out the placement error of the object surface 12a until the CPU 501 determines that the placement error of the object surface 12a that is determined based on a wavefront detected by the detecting unit 9 is less than a previously set threshold.

Thus, in the fifth embodiment a loop configuration is adopted in which the steps S404, S410, S418 and S425 in which a placement error is measured are added, and which includes steps S403, 3409, S417 and S424 that drive the stages 701 to 703 until a placement error becomes less than a threshold. The threshold is set to a desired accuracy. By this means, in comparison to the first to fourth embodiments, placement errors can be effectively reduced.

Similarly to the first embodiment, the fifth embodiment includes the step S415 of calculating a misalignment between the aspheric axis 12b of the object surface 12a and the rotational axis 704a of the rotary stage, and the step S423 of calculating a placement error based thereon. In comparison to a method according to the conventional technology that reduces a placement error to the same accuracy by only repeating measurement of the placement error and driving of stages and does not execute the aforementioned steps, the number of times that a placement error is measured is reduced according to the method of the fifth embodiment. In accompaniment therewith, the overall measurement time can be shortened.

Sixth Embodiment

Figure 14:
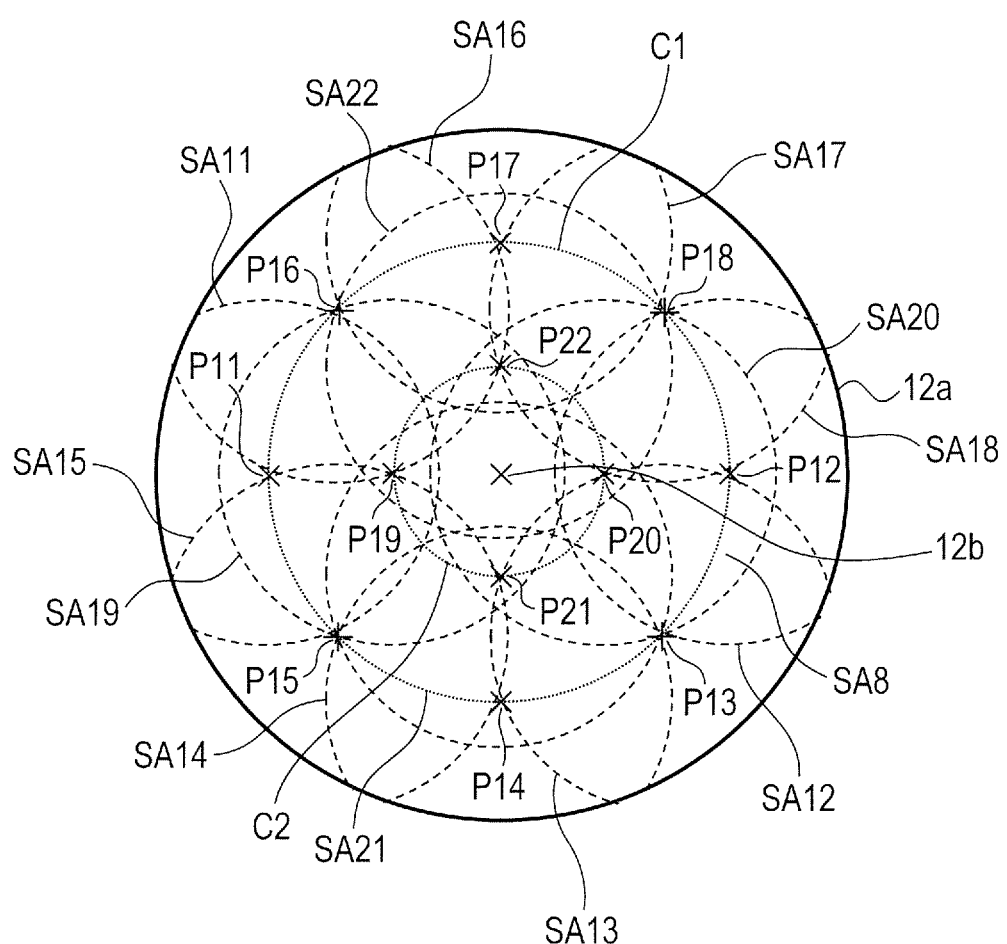
FIG. 14 is an explanatory diagram illustrating the arrangement of partial regions on an object surface of an object lens in a sixth embodiment of the present invention.

In a case where the proportion of a radius of a partial region that is illuminated at one time relative to the radius of an object surface is around ⅔, the whole object surface can be measured with the arrangement of partial regions shown in FIG. 2A. However, in a case where the proportion of the radius of a partial region that is illuminated at one time relative to the radius of an object surface is significantly less than ⅔, the whole surface cannot be measured when adopting the aforementioned arrangement. FIG. 14 is an explanatory diagram illustrating the arrangement of partial regions on an object surface of an object lens in the sixth embodiment.

For example, if the radius of a partial region that is illuminated at one time is around half of the radius of the object surface, partial regions SA11 to SA22 may be arranged as shown in FIG. 14. Here, when a circle C1 and a circle C2 that are centered on the aspheric axis 12b are considered, eight partial regions have a center on the circle C1 and four partial regions have a center on the circle C2, and thus a total of 12 partial regions are arranged that cover the whole surface. With regard to the measurement procedures, shape measurement of partial regions SA11 to SA18 is performed according to the same procedures as in steps S301 to S308 in FIG. 4 and FIG. 5, and shape measurement of partial regions SA19 to SA22 is also performed separately in a similar manner. Finally, the shapes of the partial regions SA11 to SA22 are stitched to obtain the shape of the whole object surface 12a. By increasing the number of partial regions in this manner, even if a partial region that is illuminated at one time is small, the shape of the whole object surface can be obtained.

Seventh Embodiment

Figure 15:
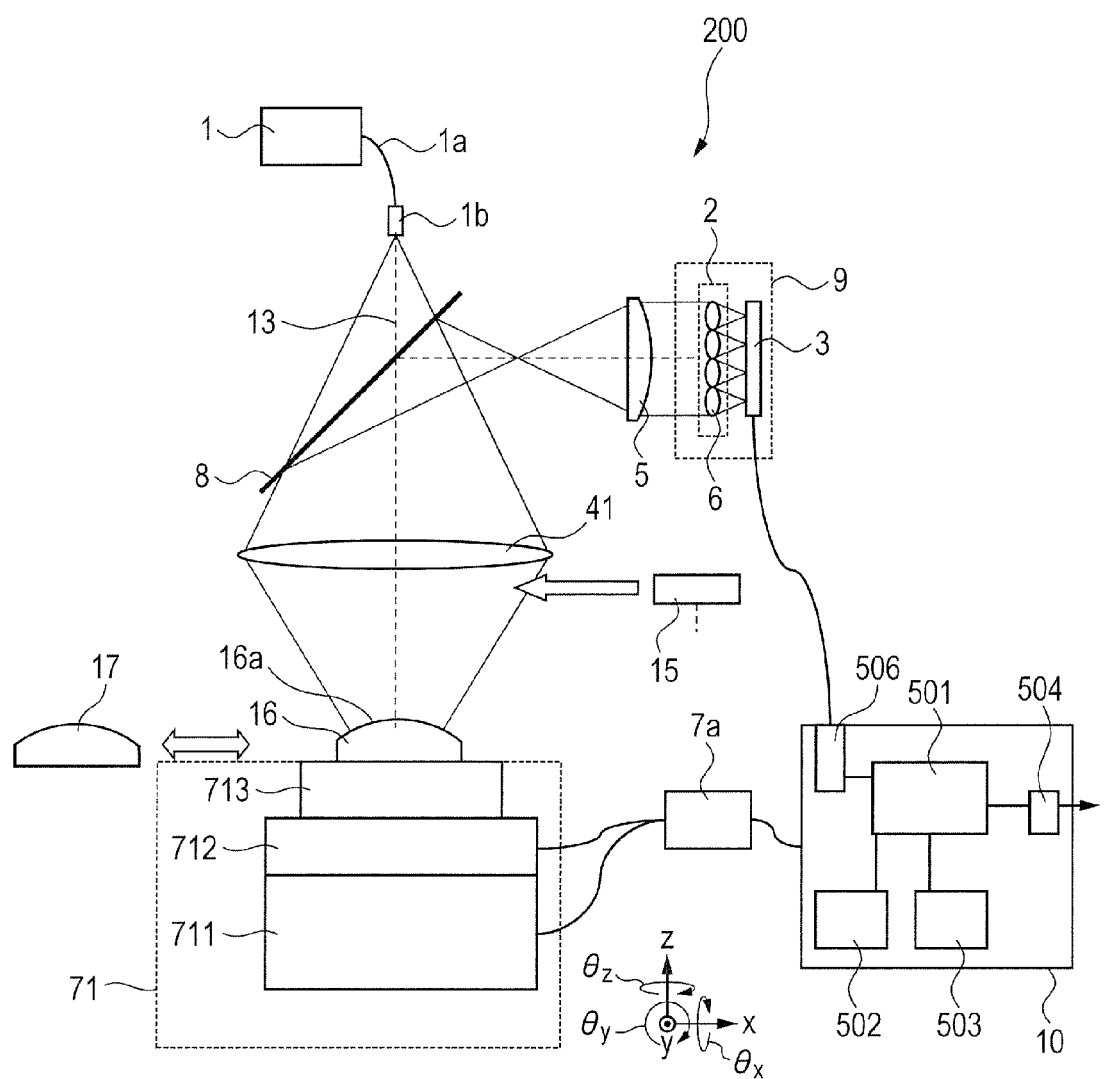
FIG. 15 is a schematic diagram illustrating a shape measuring apparatus according to a seventh embodiment of the present invention.

In the above described first to sixth embodiments, cases were described with regard to shape measurement of a rotationally symmetric lens. However, the present invention can also be applied to shape measurement in a case where the object is a cylindrical lens that has translation symmetry. FIG. 15 is a schematic diagram illustrating a shape measuring apparatus according to a seventh embodiment of the present invention.

In the seventh embodiment, a case of measuring the shape of an object lens 16 that is a cylindrical lens is described. The object lens 16 includes an object surface 16a. The object surface 16a has translation symmetry along an axis of symmetry 16b that is approximately along the y direction.

Although a shape measuring apparatus 200 illustrated in FIG. 15 is approximately the same as the shape measuring apparatus 100 shown in FIG. 1, the shape measuring apparatus 200 generates convergent light with a cylindrical lens 41 instead of the lens 4, to thereby illuminate the object lens 16. Further, the object lens 16 is mounted on a stage apparatus 71 instead of the stage apparatus 7. The stage apparatus 71 includes a stage 711 that drives the object lens 16 in the x, z, $\theta_x$, $\theta_y$, and $\theta_z$ directions, a linear stage 712 having a driving axis 712a in the y direction (linear direction) as a drive direction, and a holding base 713 that holds the object lens 16.

Figure 16:
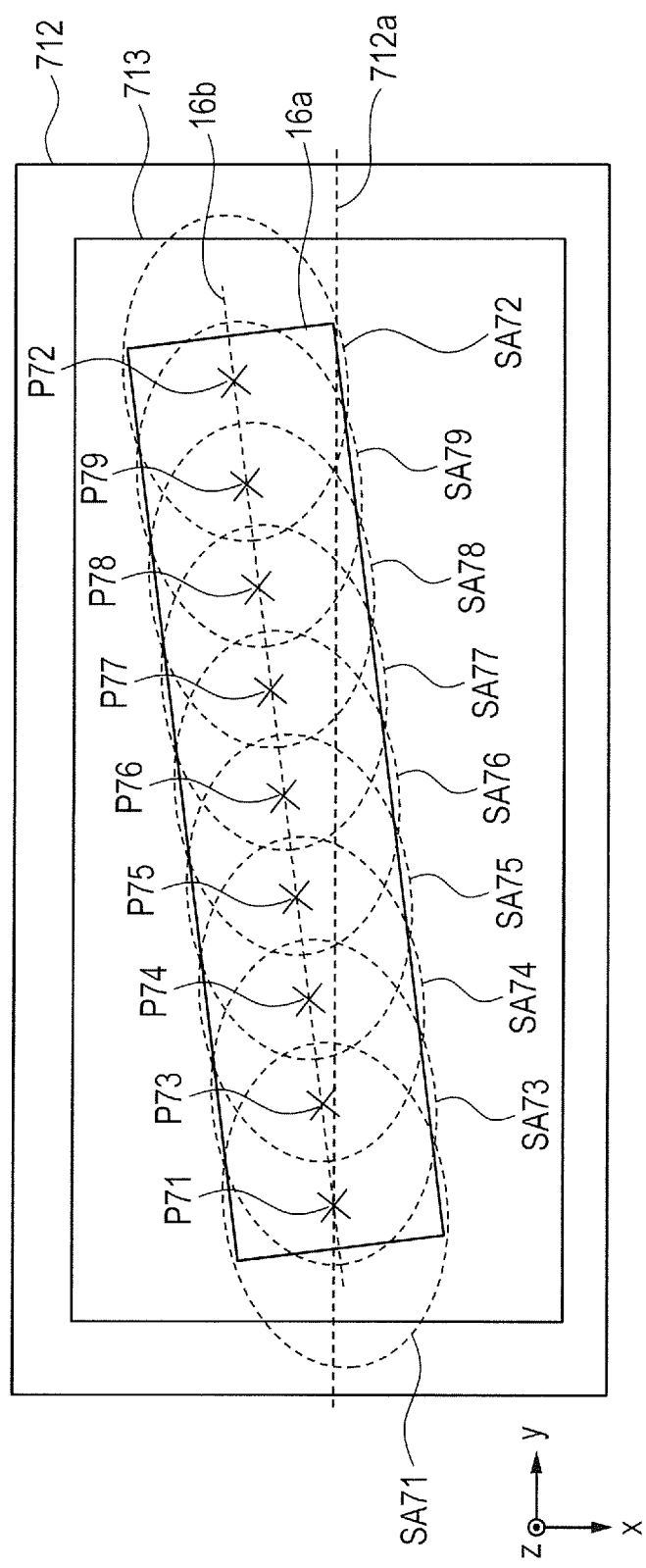
FIG. 16 is a schematic diagram illustrating a relation between a driving axis of a linear stage and an axis of symmetry of an object surface as well as the arrangement of partial regions that are measured in the shape measuring apparatus according to the seventh embodiment of the present invention.

FIG. 16 is a schematic diagram illustrating the relation between the driving axis 712a of the linear stage 712 and the axis of symmetry 16b of the object surface 16a as well as the arrangement of partial regions SA71 to SA79 that are to be measured in the shape measuring apparatus 200 according to the seventh embodiment of the present invention.

When mounting the object lens 16 on the linear stage 712, although the object lens 16 is mounted so that the axis of symmetry 16b thereof matches the driving axis 712a of the linear stage 712 as much as possible, an error accompanies such mounting. The partial regions SA71 to SA79 are arranged so that respective centers PA71 to PA79 thereof are in line with the axis of symmetry 16b. The measurement procedures in this case are approximately the same as in the first or second embodiment.

That is, after measuring a systematic error of the shape measuring apparatus 200 using the reference lens 17 whose shape is known, the shape of the partial region SA71 of the object surface 16a is measured. Thereafter, the partial region SA72 is illuminated by moving the linear stage 712, and a misalignment amount between the driving axis 712a and the axis of symmetry 16b is calculated based on a wavefront of reflected light from the partial region SA72. A placement error that arises when switching the partial region to be measured using the linear stage 712 is estimate based on the misalignment amount between the axes, and the stage 711 is driven by an amount corresponding to the misalignment amount before measuring the shapes of the partial regions SA73 to 79 to thereby align the object surface 16a.

Thus, according to the seventh embodiment, a misalignment (placement error) from a predetermined trajectory that arises when the object surface 16a is driven with the stage 712 is estimated, and the object surface 16a is aligned by driving the object surface 16a with the stage 711 so as to cancel out the misalignment. Therefore, while maintaining the alignment accuracy, the number of measurements of placement errors for alignment can be reduced and the time required for alignment can also be decreased.

Note that, the present invention is not limited to the embodiments that are described above, and many modifications are possible within the scope of the technical idea of the present invention. Further, the effects described in the embodiments of the present invention are little more than an enumeration of the most favorable effects that arise from the present invention, and effects produced by the present invention are not limited to the effects described in the embodiments of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, when measuring a partial shape of respective partial regions on an object surface, the time required for alignment can be reduced while maintaining the alignment accuracy of the object surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-027757, filed Feb. 16, 2015, which is hereby incorporated by reference herein in its entirety.

What is claimed is:

1. A shape measuring method for measuring a shape of an object surface of an object by controlling, by means of a controller, a first stage that scans the object having the object surface in a drive direction and a second stage that moves the object in a direction that is different from the drive direction of the first stage, to thereby move the object surface along a trajectory that is previously set, irradiating a measuring beam sequentially onto a plurality of partial regions of the object surface, detecting wavefronts of reflected light from each of the plurality of partial regions by a detector, and using the controller to calculate partial shape data of the plurality of partial regions based on the wavefronts, and to stitch the partial shape data, the shape measuring method comprising:

moving, in which the controller controls the first stage to move the object surface to at least two positions along the drive direction that are fewer than a number of a plurality of measurement positions along the drive directions to which the object surface is moved when detecting a wavefront of reflected light of each of the plurality of partial regions by means of the detector;

actual measuring, in which the controller unit actually measures respective placement errors with respect to the trajectory of the object surface at the at least two positions based on wavefronts detected by the detector in states in which the first stage is controlled to each of the at least two positions;

estimating, in which the controller estimates respective placement errors with respect to the trajectory of the object surface with regard to positions of the first stage, other than the at least two positions among the plurality of measurement positions based on the placement errors that are actually measured by the actual measuring; and aligning, in which, before each detection at a time of detecting respective wavefronts of reflected light from the plurality of partial regions by means of the detector for calculating the partial shape data, the controller controls the first stage to the measurement position and controls the second stage to a position that cancels out a placement error at the measurement position, to thereby align the object surface.

2. The shape measuring method according to claim 1, wherein the object surface has symmetry, and, in the estimating, the controller determines an axial misalignment quantity of an axis of symmetry of the object surface with respect to a driving axis of the first stage based on a placement error with respect to the trajectory of the object surface at the at least two positions of the first stage, and calculates respective placement errors with respect to the trajectory of the object surface at positions of the first stage other than the at least two positions, based on the axial misalignment quantity.

3. The shape measuring method according to claim 1, wherein the at least two positions are included in the plurality of measurement positions.

4. The shape measuring method according to claim 1, wherein the object surface has revolution symmetry, and the first stage is a rotary stage that scans the object in a rotational direction as the drive direction.

5. The shape measuring method according to claim 4, wherein the at least two positions include a first position, and a second position that is reached by rotating by π [rad] in the rotational direction around a driving axis of the first stage relative to the first position.

6. The shape measuring method according to claim 1, wherein the object surface has translation symmetry, and the first stage is a linear stage that scans the object in a linear direction as the drive direction.

7. The shape measuring method according to claim 1, wherein the detecting unit is a Shack-Hartmann sensor.

8. The shape measuring method according to claim 1, wherein an error component in a perpendicular direction to a travelling direction of the measuring beam is included in the placement errors of the object surface with respect to the trajectory.

9. The shape measuring method according to claim 1, wherein an error component that is parallel to a travelling direction of the measuring beam is included in the placement errors of the object surface with respect to the trajectory.

10. The shape measuring method according to claim 1, wherein an inclination error component of an axis of symmetry of the object surface is included in the placement errors of the object surface with respect to the trajectory.

11. The shape measuring method according to claim 1, wherein a reference object having a reference surface of a shape that serves as a reference for the object surface is placed on the first stage, and the method further comprising:
   error measuring, in which the controller actually measures a placement error with respect to a design position of the reference surface based on a wavefront of reflected light from the reference surface that is detected by the detector;
   reference surface aligning, in which the controller controls the second stage to a position that cancels out the placement error that is actually measured in the error measuring, to thereby align the reference surface;
   systematic error calculating, in which, after the reference surface aligning, the controller determines shape data based on a wavefront of reflected light from the reference surface that is detected with the detector, and determines a systematic error based on the shape data; and
   partial shape data calculating, in which the controller calculates the partial shape data in which the systematic error is corrected.

12. The shape measuring method according to claim 1, further comprising:
   measuring a position of a guidepost placed on the first stage while driving the first stage by the controller to acquire the driving error of the first stage; and
   controlling the second stage onto a position to cancel the driving error by the controller, for an alignment of the object surface.

13. The shape measuring method according to claim 12, wherein,
   in the measuring, the controller calculates the position of the guidepost, based on a wavefront of a light reflected from a surface of the guidepost detected by the detector.

14. The shape measuring method according to claim 1, wherein,
   in the aligning, the controller repeatedly performs control of the second stage that moves the second stage to a position that cancels out a placement error of the object surface, until the controller determines a placement error of the object surface that is based on a wavefront detected by the detector and the placement error is less than a previously set threshold.

15. A shape measuring apparatus for measuring a shape of an object surface of an object, the apparatus comprising:
   a light source for irradiating a measuring beam onto an object surface of an object;
   a first stage that scans the object with respect to the measuring beam;
   a second stage that moves the object in a direction that is different to a drive direction of the first stage;
   a detector that detects a wavefront of reflected light from the object surface; and
   a controller configured to control the first stage and the second stage to measure a shape of the object surface, wherein
   the object surface is moved along a trajectory that is previously set, the light source irradiates a measuring beam sequentially onto a plurality of partial regions of the object surface, the detector detects wavefronts of reflected light from each of the plurality of partial regions by a detector, and the controller calculates partial shape data of the plurality of partial regions based on the wavefronts and to stitch the partial shape data,
   the controller controls the first stage to move the object surface to at least two positions along the drive direction that are fewer than a number of a plurality of measurement positions along the drive directions to which the object surface is moved when detecting a wavefront of reflected light of each of the plurality of partial regions by means of the detector,
   the controller actually measures respective placement errors with respect to the trajectory of the object surface at the at least two positions based on wavefronts detected by the detector in states in which the first stage is controlled to each of the at least two positions,
   the controller estimates respective placement errors with respect to the trajectory of the object surface with regard to positions of the first stage other than the at least two positions among the plurality of measurement positions based on the placement errors that are actually measured by the actual measuring, and,
   before each detection at a time of detecting respective wavefronts of reflected light from the plurality of partial regions by means of the detector for calculating the partial shape data, the controller controls the first stage to the measurement position and controls the second stage to a position that cancels out a placement error at the measurement position, to thereby align the object surface.

16. A non-transitory computer-readable recording medium storing a readable program for operating a computer to execute a shape measuring method for measuring a shape of an object surface of an object by controlling, by means of a controller, a first stage that scans the object having the object surface in a drive direction and a second stage that moves the object in a direction that is different from the drive direction of the first stage, to thereby move the object surface along a trajectory that is previously set, irradiating a measuring beam sequentially onto a plurality of partial regions of the object surface, detecting wavefronts of reflected light from each of the plurality of partial regions by a detector, and using the controller to calculate partial shape data of the plurality of partial regions based on the wavefronts, and to stitch the partial shape data,
   the shape measuring method comprising:
   moving, in which the controller controls the first stage to move the object surface to at least two positions along the drive direction that are fewer than a number of a plurality of measurement positions along the drive directions to which the object surface is moved when detecting a wavefront of reflected light of each of the plurality of partial regions by means of the detector;
   actual measuring, in which the controller actually measures respective placement errors with respect to the trajectory of the object surface at the at least two positions based on wavefronts detected by the detector, in states in which the first stage is controlled to each of the at least two positions;
   estimating, in which the controlling unit estimates respective placement errors with respect to the trajectory of the object surface with regard to positions of the first stage, other than the at least two positions among the plurality of measurement positions, based on the placement errors that are actually measured by the actual measuring; and
   aligning, in which, before each detection at a time of detecting respective wavefronts of reflected light from the plurality of partial regions by means of the detector for calculating the partial shape data, the controller controls the first stage to the measurement position and controls the second stage to a position that cancels out a placement error at the measurement position, to thereby align the object surface.

17. A method of manufacturing an optical element, the method comprising:

forming a shape of an optical element; and examining the optical element, based on a result of measuring a shape of the optical element, wherein the measuring the shape of the optical element is performed by controlling, by means of a controller, a first stage that scans the optical element having the optical element surface in a drive direction and a second stage that moves the object in a direction that is different from the drive direction of the first stage, to thereby move the object surface along a trajectory that is previously set, irradiating a measuring beam sequentially onto a plurality of partial regions of the optical element surface, detecting wavefronts of reflected light from each of the plurality of partial regions by a detector, and using the controller to calculate partial shape data of the plurality of partial regions based on the wavefronts, and to stitch the partial shape data, the shape measuring method comprising:

moving, in which the controller controls the first stage to move the optical element surface to at least two positions along the drive direction that are fewer than a number of a plurality of measurement positions along the drive directions to which the optical element surface is moved when detecting a wavefront of reflected light of each of the plurality of partial regions by means of the detector;

actual measuring, in which the controller actually measures respective placement errors with respect to the trajectory of the object surface at the at least two positions based on wavefronts detected by the detector in states in which the first stage is controlled to each of the at least two positions;

estimating, in which the controller estimates respective placement errors with respect to the trajectory of the optical element surface with regard to positions of the first stage, other than the at least two positions among the plurality of measurement positions, based on the placement errors that are actually measured by the actual measuring; and aligning, in which, before each detection at a time of detecting respective wavefronts of reflected light from the plurality of partial regions by means of the detector for calculating the partial shape data, the controller controls the first stage to the measurement position and controls the second stage to a position that cancels out a placement error at the measurement position, to thereby align the object surface.

18. An optical element manufactured according to a manufacturing method comprising:

forming a shape of an optical element; and examining the optical element, based on a result of measuring a shape of the optical element, wherein the measuring the shape of the optical element is performed by controlling, by means of a controller, a first stage that scans the optical element having the optical element surface in a drive direction and a second stage that moves the object in a direction that is different from the drive direction of the first stage, to thereby move the object surface along a trajectory that is previously set, irradiating a measuring beam sequentially onto a plurality of partial regions of the optical element surface, detecting wavefronts of reflected light from each of the plurality of partial regions by a detecting unit, and using the controller to calculate partial shape data of the plurality of partial regions based on the wavefronts, and to stitch the partial shape data, the shape measuring method comprising:

moving, in which the controller controls the first stage to move the optical element surface to at least two positions along the drive direction that are fewer than a number of a plurality of measurement positions along the drive directions to which the optical element surface is moved when detecting a wavefront of reflected light of each of the plurality of partial regions by means of the detector;

actual measuring, in which the controller actually measures respective placement errors with respect to the trajectory of the object surface at the at least two positions based on wavefronts detected by the detector in states in which the first stage is controlled to each of the at least two positions;

estimating, in which the controller estimates respective placement errors with respect to the trajectory of the optical element surface with regard to positions of the first stage, other than the at least two positions among the plurality of measurement positions, based on the placement errors that are actually measured by the actual measuring; and aligning, in which, before each detection at a time of detecting respective wavefronts of reflected light from the plurality of partial regions by means of the detector for calculating the partial shape data, the controller controls the first stage to the measurement position and controls the second stage to a position that cancels out a placement error at the measurement position, to thereby align the object surface.

* * * * *